(12) United States Patent
Chiba et al.

(10) Patent No.: US 10,963,626 B2
(45) Date of Patent: Mar. 30, 2021

(54) PROOFING TASK PANE

(71) Applicant: Microsoft Technology Licensing, LLC, Redmond, WA (US)

(72) Inventors: Kenichiro Chiba, Redmond, WA (US); Alfredo Arnaiz, Bellevue, WA (US); Dermot McLoughlin, Dublin (IE); Nicole Michel, Dublin (IE); Hani Farouq Abu-Huwaij, Bothell, WA (US); Rolf Ebeling, Kirkland, WA (US); Shikha Devesh Desai, Bellevue, WA (US); Maria Isabel R. Carpenter, Lynnwood, WA (US); Jesse Clay Satterfield, Seattle, WA (US); Michael Koenig, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 15/344,283

(22) Filed: Nov. 4, 2016

(65) Prior Publication Data

US 2017/0220360 A1 Aug. 3, 2017

Related U.S. Application Data

(60) Provisional application No. 62/289,856, filed on Feb. 1, 2016, provisional application No. 62/289,866, filed
(Continued)

(51) Int. Cl.
*G06F 17/00* (2019.01)
*G06F 40/166* (2020.01)
(Continued)

(52) U.S. Cl.
CPC .......... *G06F 40/166* (2020.01); *G06F 3/0482* (2013.01); *G06F 3/167* (2013.01);
(Continued)

(58) Field of Classification Search
None
See application file for complete search history.

(56) References Cited

U.S. PATENT DOCUMENTS 4,859,091 A 8/1989 Ueda
5,678,053 A 10/1997 Anderson
(Continued)

FOREIGN PATENT DOCUMENTS

EP 0093249 11/1983

OTHER PUBLICATIONS

"Microsoft Word 2013 an Essential Guide", NPL, pp. 1-17, dated 2014, URL<http://www.reading.ac.uk/web/files/its/WordEssen13.pdf> (Year: 2014).*

(Continued)

*Primary Examiner* — Mustafa A Amin
(74) *Attorney, Agent, or Firm* — Merchant & Gould P.C.

(57) ABSTRACT

In non-limiting examples of the present disclosure, systems and methods for providing customizable electronic document review options within electronic document processing applications are provided. An analysis of an electronic document may be performed comprising a review of an electronic document for a plurality of style issues, a plurality of spelling issues and a plurality of grammar issues. A proofing task pane having a plurality of selectable options may be displayed. A total number of identified issues associated with each of the plurality of style issues, the plurality of spelling issues and the plurality of grammar issues may be displayed in the task pane based on the analysis of the electronic document. A value associated with the electronic document may be calculated based on a fluency metric associated with the electronic document and an indication of the fluency value for the electronic document may be displayed in the task pane.

20 Claims, 15 Drawing Sheets

Related U.S. Application Data on Feb. 1, 2016, provisional application No. 62/289,805, filed on Feb. 1, 2016.

(51) Int. Cl.
*G06F 9/451* (2018.01)
*G06F 40/47* (2020.01)
*G06F 40/109* (2020.01)
*G06F 40/117* (2020.01)
*G06F 40/232* (2020.01)
*G06F 40/247* (2020.01)
*G06F 40/253* (2020.01)
*G06F 40/295* (2020.01)
*G06F 3/0482* (2013.01)
*G06F 3/16* (2006.01)

(52) U.S. Cl.
CPC ............ *G06F 9/453* (2018.02); *G06F 40/109* (2020.01); *G06F 40/117* (2020.01); *G06F 40/232* (2020.01); *G06F 40/247* (2020.01); *G06F 40/253* (2020.01); *G06F 40/295* (2020.01); *G06F 40/47* (2020.01)

(56) References Cited

U.S. PATENT DOCUMENTS

| | | |
|---|---|---|
| 5,960,447 A | 9/1999 | Holt et al. |
| 6,085,206 A | 7/2000 | Domini et al. |
| 6,175,834 B1 | 1/2001 | Cai et al. |
| 6,583,798 B1 | 6/2003 | Hoek et al. |
| 6,611,802 B2 | 8/2003 | Lewis et al. |
| 6,889,361 B1 | 5/2005 | Bates et al. |
| 6,918,086 B2 | 7/2005 | Rogson |
| 7,069,508 B1* | 6/2006 | Bever ............... G06F 17/212 715/234 |
| 7,260,773 B2* | 8/2007 | Zernik ............... G06F 17/2211 707/999.202 |
| 7,424,674 B1 | 9/2008 | Gross et al. |
| 7,752,034 B2 | 7/2010 | Brockett et al. |
| 7,778,816 B2 | 7/2010 | Reynar |
| 7,908,132 B2 | 3/2011 | Brockett et al. |
| 8,078,451 B2 | 12/2011 | Dolan et al. |
| 8,136,037 B2 | 3/2012 | Adams et al. |
| 8,645,124 B2 | 2/2014 | Karov Zangvil |
| 8,886,735 B1* | 11/2014 | Liu ..................... G06Q 10/107 709/206 |
| 8,903,719 B1 | 12/2014 | Landry et al. |
| 8,914,278 B2 | 12/2014 | Zangvil |
| 9,002,700 B2 | 4/2015 | Hoover et al. |
| 9,015,036 B2 | 4/2015 | Karov Zangvil |
| 9,026,432 B2 | 5/2015 | Zangvil |
| 9,459,846 B2 | 10/2016 | Bornheimer et al. |
| 9,465,793 B2 | 10/2016 | Hoover |
| 9,665,559 B2 | 5/2017 | Gross et al. |
| 9,672,203 B1 | 6/2017 | Bhar |
| 2003/0004716 A1 | 1/2003 | Haigh et al. |
| 2004/0153466 A1 | 8/2004 | Ziff et al. |
| 2004/0249630 A1 | 12/2004 | Parry et al. |
| 2005/0125215 A1 | 6/2005 | Wu et al. |
| 2006/0123329 A1 | 6/2006 | Steen et al. |
| 2006/0143564 A1 | 6/2006 | Bates et al. |
| 2006/0247914 A1 | 11/2006 | Brener |
| 2006/0282413 A1* | 12/2006 | Bondi ............... G06F 17/30864 |
| 2007/0067294 A1* | 3/2007 | Ward ............... G06F 17/30867 |
| 2008/0071612 A1 | 3/2008 | Mah et al. |
| 2008/0195379 A1 | 8/2008 | Vanderwold et al. |
| 2008/0208567 A1 | 8/2008 | Brockett et al. |
| 2009/0006950 A1 | 1/2009 | Gross et al. |
| 2009/0055761 A1 | 2/2009 | Basson et al. |
| 2009/0171649 A1 | 7/2009 | Kishore et al. |
| 2009/0235159 A1 | 9/2009 | Hosoda |
| 2009/0319927 A1* | 12/2009 | Beeman ............... G06F 17/24 715/764 |
| 2010/0228365 A1 | 9/2010 | Chrobok-Diening et al. |
| 2010/0257182 A1 | 10/2010 | Saliba et al. |
| 2010/0275118 A1 | 10/2010 | Iakobashvili et al. |
| 2010/0286979 A1 | 11/2010 | Zangvil |
| 2011/0035364 A1 | 2/2011 | Lipsey |
| 2011/0086331 A1 | 4/2011 | Karov Zangvil |
| 2011/0191105 A1* | 8/2011 | Spears ............... G06F 17/30867 704/251 |
| 2011/0313757 A1* | 12/2011 | Hoover ............... G06F 17/274 704/9 |
| 2012/0297294 A1* | 11/2012 | Scott ............... G06F 17/273 715/261 |
| 2013/0006613 A1 | 1/2013 | Karov Zangvil |
| 2013/0055074 A1 | 2/2013 | Trese et al. |
| 2013/0073531 A1 | 3/2013 | Robinson et al. |
| 2013/0179169 A1* | 7/2013 | Sung ............... G06F 17/27 704/254 |
| 2013/0226927 A1 | 8/2013 | Verma et al. |
| 2014/0032683 A1* | 1/2014 | Maheshwari ......... H04L 51/063 709/206 |
| 2014/0120961 A1* | 5/2014 | Buck ............... H04W 4/12 455/466 |
| 2014/0122062 A1 | 5/2014 | Zangvil |
| 2014/0282837 A1 | 9/2014 | Heise et al. |
| 2014/0288915 A1 | 9/2014 | Madnani et al. |
| 2014/0289617 A1 | 9/2014 | Rajagopalan |
| 2014/0342341 A1* | 11/2014 | Rea ............... G09B 7/02 434/351 |
| 2015/0104763 A1 | 4/2015 | Hausmann |
| 2015/0149876 A1* | 5/2015 | Davis ............... G06F 16/958 715/212 |
| 2015/0154174 A1 | 6/2015 | Hoover |
| 2015/0199318 A1 | 7/2015 | Lemonik |
| 2015/0220509 A1 | 8/2015 | Karov Zangvil |
| 2015/0309983 A1 | 10/2015 | Hoover |
| 2016/0087925 A1* | 3/2016 | Kalavagattu ......... H04L 51/066 709/206 |
| 2016/0103808 A1 | 4/2016 | Anders et al. |
| 2016/0162473 A1* | 6/2016 | Cogley ............... G06F 17/28 704/9 |
| 2016/0246772 A1 | 8/2016 | Hoover |
| 2016/0371248 A1 | 12/2016 | Hoover |
| 2017/0220535 A1 | 8/2017 | Olsen |
| 2017/0220536 A1 | 8/2017 | Chiba et al. |
| 2018/0067912 A1 | 3/2018 | Deluca et al. |

OTHER PUBLICATIONS

U.S. Appl. No. 15/354,381, Office Action dated Jan. 9, 2018, 21 pages.

U.S. Appl. No. 15/270,563, Office Action dated Dec. 7, 2017, 19 pages.

"Find Inconsistencies in Your Writing", Available at: https://prowritingaid.com/art/14/Find-inconsistencies-in-your-witing.aspx, Apr. 7, 2012, 5 pages.

"Frontlab Proofing—Solutions", Available at: http://www.frontlab.com/proofing/solutions.aspx, Mar. 9, 2016, 3 pages.

"Grammarly", Available at: https://www.grammarly.com/spell-check, Jan. 15, 2016, 11 pages.

"MST Redact", Available at: http://www.ms-technology.com/viewing-solutions/redact/#HyPerLink_format, Mar. 9, 2016, 2 pages.

"Proofreading Support", Available at: https://en.support.wordpress.com/proofreading/, Feb. 2, 2016, 6 pages.

"Smart Translate", Available at: http://www.2x4.de/#!smart-translate/mptfb, Mar. 9, 2016, 6 pages.

"StyleWriter Professional Writing and Editing Software Features", Available at: http://www.editorsoftware.com/StyleWriter_Features_html#professional_proofreading_editing_writing_software, Aug. 9, 2013, 3 pages.

"Understanding Proofreading and Copyediting", Available at: http://www.avsgroup.com/articles/articletype/articleview/articleid/20/proofreading-and-copyediting, Feb. 13, 2015, 1 page.

Agrawal, Harsh, "5 Free Online Proofreader Tools for Error-Free Writing", Available at: http://www.shoutmeloud.com/online-proofreading-tools-english-writing.html, Mar. 17, 2015, 7 pages.

(56) References Cited

OTHER PUBLICATIONS

Kukich, Karen, "Techniques for Automatically Correcting Words in Text", In Journal of ACM Computing Surveys, vol. 24, Issue 4, Dec. 1992, 63 pages.
Mapue, Joseph, "50 Best Microsoft Word Add-ins: Take Documents from Awful to Awesome", Available at: http://www.skilledup.com/articles/50-best-microsoft-word-add-ins , Jul. 23, 2014, 13 pages.
Mastykarz, Waldek, "Easy search and replace with Mavention Search and Replace", Available at: https://blog.mastykarz.nl/spell-checking-brand-names-mavention-spell-check/, Sep. 29, 2012, 8 pages.
Matt, "How to Stop Word 2010 from Underlining Misspelled Words", Available at: http://www.solveyourtech.com/how-to-stop-word-2010-from-underlining-misspelled-words/, May 4, 2015, 7 pages.
McCandlish, Stanton, "EFF's Top 12 Ways to Protect Your Online Privacy", Available at: https://www.eff.org/wp/effs-top-12-ways-protect-your-online-privacy, Apr. 2002, 10 pages.
Schwartz, Steve, "Getting Started with Word 2013", Available at: http://www.peachpit.com/articles/article.aspx?p=2044335&seqNum=7, Apr. 22, 2013, 7 pages.
"Final Office Action Issued in U.S. Appl. No. 15/270,563", dated Sep. 14, 2018, 18 Pages.
"Final Office Action Issued in U.S. Appl. No. 15/354,381", dated Aug. 9, 2018, 23 Pages.
Anonymous, "After the Deadline (Extension for OpenOffice.org)", Aug. 22, 2010, retrieved from the internet on Apr. 11, 2017 at: http://web.archive.org/web/20100822031718/http://www.afterthedeadline.com/download.slp?platform=OpenOffice, 3 pgs.
PCT International Search Report and Written Opinion in International Application PCT/US2017/015537, dated May 2, 2017, 14 pgs.
PCT International Search Report and Written Opinion in International Application PCT/US2017/015538, dated May 4, 2017, 13 pgs.
PCT International Search Report and Written Opinion in International Application PCT/US2017/016049, dated Apr. 21, 2017, 18 pgs.
"Non Final Office Action Issued in U.S. Appl. No. 15/270,563", dated Jan. 8, 2019, 18 Pages.
"Non Final Rejection Issued in U.S. Appl. No. 15/354,381", dated Jan. 25, 2019, 24 Pages.
"Final Office Action Issued in U.S. Appl. No. 15/354,381", dated Aug. 22, 2019, 25 Pages.
"Final Office Action Issued in U.S. Appl. No. 15/270,563", dated Jul. 23, 2019, 17 Pages.
"Non Final Office Action Issued in U.S. Appl. No. 15/270,563", dated May 18, 2020, 20 Pages.
"Non Final Office Action Issued in U.S. Appl. No. 15/354,381", dated Jan. 14, 2020, 26 Pages.
"Final Office Action Issued in U.S. Appl. No. 15/270,563", dated Oct. 19, 2020, 18 Pages.

* cited by examiner

FIG. 1

Document 1

| File | Home | Insert | Design | Layout | References | Mailings | Review | View |

Grant Proposal: EXPLORING ENGLISH FOR BETTER LIVING

English Coaching Institute, Heathcliff D. Martin, Curricular Programming Coordinator

The Organization

The English Coaching Institute (ECI) serves students ages 6-12 in a culturally diverse community. The students are at least one year behind their age-appropriate academic level; the majority risk failing at that level. The principal goal of ECI is to serve out-of-school youth whose parents have difficulty funding their children's academic advancement, even with the support of other nonprofit groups. ECI's programs are developed to close the achievement gap.

Objectives

- Students increase learning level by 20-35%, as measured by standardized reading and comprehension tests.
- After six months, at least 85% of students (proportionately distributed among African-American, Chinese, Caucasian, and Latino students) overcome reading and comprehension difficulties.
- At least 75% of students show a clearer understanding and wider knowledge of the subject areas tackled after completing the program.
- All students demonstrate improvement in the four English language proficiency areas, as measured by the pre-test and post-test conducted by the participating non-profit agencies.

Evaluation

- QUANTITATIVE: intake measurements from a relevant referring non-profit, compared to periodic metrics in the relevant programs, (to be determined by the program coordinator).

Page 1 of 2   542 words   English (United States)

Writing Assistance

Document Overview

- 0 Spelling
- 1 Grammar
- 8 Writing Assistance
- 4 Consistency
- 0 Clarity and Conciseness
- 3 Vocabulary Choice
- 1 Inclusive Language
- 0 Formal Language

Readability Metrics
MED Fluency Index

Organization Guidelines
- Spelling & Grammar
- Consistency
- Inclusive Language
- Privacy
- Branding Group issues by page Page 1: difficulty funding their children's academic advancement, even with the support of other nonprofit groups.

(proportionately distributed among African-American, Chinese, Caucasian, and Latino students)

Document 1

File | Home | Insert | Design | Layout | References | Mailings | Review | View

Calibri | 8 pt.
B I U abc X₂ X²

AaBbCc ¶Normal | AaBb ¶No Spac.. | AaBb ¶Head.. | AaBb

Find
Replace
Select
Editing

Font | Paragraph | Styles

Writing Assistance

Document Overview
- 0 Spelling ▶
- 1 Grammar ▶

Highlight Grammar Issues
- ☑ Always
- ☐ Only with Proofing Pane
- ☐ Never

Check these Rules
- ! ☑ Capitalization
- ! ☑ Capitalization in Sentences
- ! ☑ Hyphenation
- ! ☑ Misused Words
- ☑ Noun Phrases
- ! ☑ Punctuation
- ☑ Spacing
- ! ☑ Subject Verb Agreement
- ☑ Verb Phrases

[!] Indicates checks required per your organization's guidelines

---

Grant Proposal: EXPLORING ENGLISH FOR BETTER LIVING

English Coaching Institute, Heathcliff D. Martin, Curricular Programming Coordinator

The Organization

The English Coaching Institute (ECI) serves students ages 6-12 in a culturally diverse community. The students are at least one year behind their age-appropriate academic level; the majority risk failing at that level. The principal goal of ECI is to serve out-of-school youth whose parents have difficulty funding their children's academic advancement, even with the support of other nonprofit groups. ECI's programs are developed to close the achievement gap.

Objectives

- Students increase learning level by 20-35%, as measured by standardized reading and comprehension tests.
- After six months, at least 85% of students (proportionately distributed among African-American, Chinese, Caucasian, and Latino students) overcome reading and comprehension difficulties.
- At least 75% of students show a clearer understanding and wider knowledge of the subject areas tackled after completing the program.
- All students demonstrate improvement in the four English language proficiency areas, as measured by the pre-test and post-test conducted by the participating non-profit agencies.

Evaluation

- QUANTITATIVE: intake measurements from a relevant referring non-profit, compared to periodic metrics in the relevant programs, (to be determined by the program coordinator).

African-American, Chinese, Caucasian, and Latino students)

Page 1 of 2    542 words    English (United States)    104%

*FIG. 8*

Document 1

| File | Home | Insert | Design | Layout | References | Mailings | Review | View |

Calibri | 8 pt.
B I U abc | A

AaBbCc ¶Normal | AaBb ¶No Spac.. | AaBb ¶Head.. | AaBb

Find ▶
Replace
Select ▶
Editing

Writing Assistance
Document Overview
- Spelling ▶
- Grammar ▶
- Writing Assistance ▶
- [0] Consistency ▶
- [0] Clarity and Conciseness ▶
- [0] Vocabulary Choice ▶
- [0] Inclusive Language ▶
- [0] Formal Language ▶

Readability Metrics ▶
MED Fluency Index

Organization Guidelines ▶
- Spelling & Grammar
- Consistency
- Inclusive Language
- Privacy
- Branding Congratulations!
You have resolved all proofing issues in this document.

Grant Proposal: EXPLORING ENGLISH FOR BETTER LIVING
English Coaching Institute, Heathcliff D. Martin, Curricular Programming Coordinator

The Organization
The English Coaching Institute (ECI) serves students ages 6-12 in a culturally diverse community. The students are at least one year behind their age-appropriate academic level; the majority risk failing at that level. The principal goal of ECI is to serve out-of-school youth w[ith] their children's academic advancement, even with the support of other non-profit [ ]ed to close the achievement gap.

Word Processing Application ✕
Proofing check is complete.
You're good to go!
OK

Objectives
- Students increase learnin[g ]tandardized reading and comprehension tests.
- After six months, at least 85% of students (proportionately distributed among African-American, Chinese, Caucasian, and Hispanic students) overcome reading and comprehension difficulties.
- At least 75% of students show a clearer understanding and wider knowledge of the subject areas tackled after completing the program.
- All students demonstrate improvement in the four English language proficiency areas, as measured by the pre-test and post-test conducted by the participating non-profit agencies.

Evaluation
- QUANTITATIVE: intake measurements from a relevant referring non-profit, compared to periodic metrics in the relevant programs, (to be determined by the program coordinator).

Page 1 of 2    542 words    English (United States)    + 104%

800, 802, 804, 806, 808

PROOFING TASK PANE

CROSS-REFERENCE TO RELATED APPLICATIONS

This application claims the benefit of U.S. Provisional Application Ser. No. 62/289,856, filed Feb. 1, 2016, the complete disclosure of which is hereby incorporated by reference in its entirety.

Details regarding the present disclosure are also provided in U.S. Provisional Application Ser. No. 62/289,866, entitled "Contextual Menu with Additional Information to Help User Choice", filed Feb. 1, 2016; and U.S. Provisional Application Ser. No. 62/289,805, entitled "Enterprise Writing Assistance", filed Feb. 1, 2016, the entireties of which are hereby incorporated by reference.

BACKGROUND

Document review systems such as spell check and grammar check are integral processes of most word processing applications. Generally, these processes allow a user to identify individual occurrences of spelling and grammar errors within a document.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Non-limiting examples of the present disclosure describe systems and methods for performing operations on a graphical user interface, comprising: performing an analysis of an electronic document, wherein the analysis comprises reviewing the electronic document for a plurality of style issues, a plurality of spelling issues and a plurality of grammar issues; displaying, in a document processing application, a proofing task pane having a plurality of selectable options; based on the analysis of the electronic document, displaying in the task pane, a total number of identified issues associated with each of the plurality of style issues, the plurality of spelling issues and the plurality of grammar issues; calculating a fluency value, based on a fluency metric associated with the electronic document; and displaying, in the task pane, an indication of the fluency value for the electronic document.

BRIEF DESCRIPTION OF THE DRAWINGS

Non-limiting and non-exhaustive examples are described with reference to the following figures:

FIG. 1 is an exemplary proofing task pane of shown in a word processing application, displaying a plurality of proofing options.

FIG. 2 is an exemplary drill-in proofing task pane displaying specific issues in a document that are related to a "consistency" specific rule.

FIG. 3 is a menu associated with a proofing task pane for selectively activating and deactivating selectable grammar-based options associated with an electronic document.

FIG. 8 is an exemplary proofing task pane further illustrating a user interface indicating that an electronic document complies with all applied rules.

DETAILED DESCRIPTION

Figure 4:
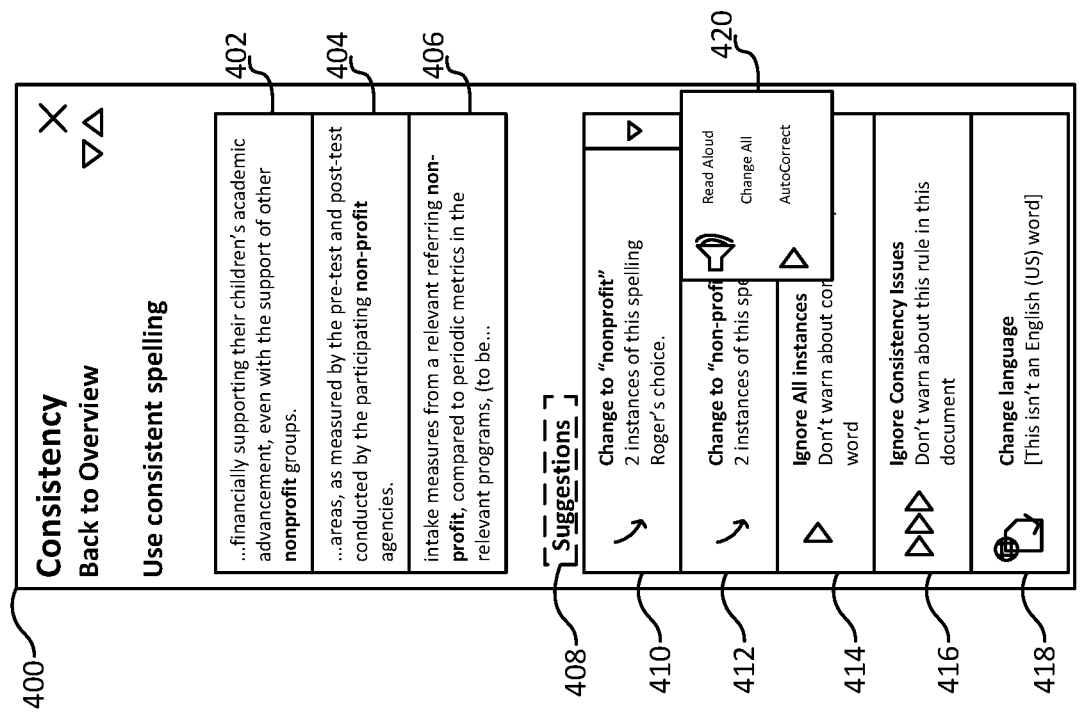
FIG. 4 is an enlarged view of an exemplary consistency drill-in proofing task pane which may be displayed in or adjacent to an electronic document.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Generally, the present disclosure is directed to providing, in an electronic document processing application, an enhanced proofing task pane (also referred to herein as the "proofing pane" or the "pane"). In particular, the enhanced proofing task pane provides, in a single user interface, a summary of the spelling, grammar, style and accessibility issues relating to an entire document. As a result, a user can quickly and efficiently ascertain and address (i.e., view, fix, modify, ignore a single instance, ignore multiple or all instances) the issues within the entire document by number, type and relation to one or more intended audience groups. For instance, a user can quickly ascertain and address the total number of spelling and grammatical issues in the document. The user may also ascertain and address the total number of style and accessibility issues flagged and otherwise identified in the entire document.

The proofing task pane surfaces issues identified by the systems and methods described herein related to an electronic document (i.e., those issues identified once certain rules engines have been applied to analyze the document— e.g., a spell checker, a grammar checker, a style checker, an accessibility checker etc.). Certain applied rules may be configurable enterprise-based or user-based rules, such as, for example, rules for assisting a user to identify issues relating to the use of confidential information, the identification of brand names, the use of formal language, and the identification of potential privacy issues. It is possible that the proofing pane may also be configurable by a user from the pane or separately. The proofing pane may also provide navigation capability within an electronic document itself. For example, a user may move from a first identified spelling, grammar, style or accessibility issue in an electronic document to a next identified spelling, grammar, style or accessibility issue in the electronic document and sequentially address each identified issue throughout the electronic document.

According to some aspects, the proofing task pane includes an interface to display results relating to a spelling analysis performed on an electronic document. The spelling interface may graphically indicate the number of spelling errors within an electronic document based on an analysis performed by an electronic document processing application. The proofing pane may additionally provide detailed information regarding misspelled words, recommendations for replacing those misspelled words, definitions for those words, explanations relating to those recommendations, synonyms of those words, exemplary usage of those words in context, etc. Such additional information may be displayed on the primary proofing pane or within a drill-in pane that may be selected from the primary proofing pane and subsequently shown in place of or in addition to the primary proofing pane.

According to additional aspects, the proofing task pane includes an interface to display results relating to a grammar analysis performed on an electronic document. The grammar interface may graphically indicate the number of grammar issues within an electronic document based on an analysis performed by an electronic document processing application. The proofing pane may additionally provide detailed information regarding grammar issues in an electronic document including recommendations for replacing or correcting those issues, synonyms for suggested replacement words, exemplary usage samples of suggested words in context, explanations regarding identified grammar issues, explanations relating to recommendations, etc. Such additional information may be displayed on the primary proofing pane or within a drill-in pane that may be selected from the primary proofing pane and subsequently shown in place of or in addition to the primary proofing pane.

According to another aspect, the proofing task pane includes a writing assistance interface to display results relating to a style analysis performed on an electronic document. For example, the writing assistance interface may graphically indicate the number of consistency issues, clarity and conciseness issues, vocabulary choice issues, inclusive language issues, and formal language issues within an electronic document based on an analysis performed by an electronic document processing application. Each of the style issues may be individually selectable to provide further information relating to the selected style issue. For example, based on a selected style issue, the proofing task pane may further display portions of an electronic document including identified style issues, recommendations for correcting those issues, explanations relating to the selected issues or recommendations, etc. As with the spelling and grammar options, the pane may provide additional information regarding the style issues, either on the primary pane or within a drill-in pane.

According to yet another aspect, the proofing task pane includes an interface to display results relating to an accessibility analysis performed on an electronic document. The accessibility interface may graphically indicate the number of accessibility issues within an electronic document based on an analysis performed by an electronic document processing application. The proofing task pane may additionally provide detailed information regarding accessibility issues in the electronic document including: recommendations to textually describe embedded images, videos and audio files; to increase the size of text; to change the color of text; to change a background color of an electronic document or a portion thereof and to change a font type for text in an electronic document. Such additional information may be displayed on the primary proofing pane or within a drill-in pane that may be selected from the primary proofing pane.

A user may select any one of the spelling interface, the grammar interface, the writing assistance interface (or any specific style issue within the writing assistance interface), or the accessibility interface causing the electronic document processing application to display, in a drill-in pane, further information relating to a selected issue. For example, the electronic document processing application may display, in a drill-in pane, the first instance of any flagged word or phrase under the selected issue. The drill-in pane may further provide one or more suggestions for modifying a flagged word or phrase. The drill-in pane may also allow the user to modify a word or phrase within an electronic document, for example by providing an option to insert a recommended word in an electronic document or by providing an option to ignore a flagged word or phrase. Upon modification of a flagged word or phrase in the electronic document, the drill-in pane may move to the next flagged word or phrase in the selected category until there are no more flagged words or phrases in a selected category. According to additional aspects, the proofing task pane may be contemporaneously updated to reflect the number of errors or issues that exist in an electronic document for each proofing option based on a user's correction (or input selection to ignore) of a flagged word or term.

According to additional aspects, the proofing task pane displays a fluency metric (which may alternatively be referred to herein as a "readability metric" or a "fluency index") reflecting an analysis regarding how an electronic document may be understood and perceived by a selected target audience. According to examples a fluency metric on a scale of 1 to 5 may be provided. Other scales and mechanisms of display may be utilized according to the systems and methods provided herein for providing this information to a user. For example, a color scale may be used, a 1 to 10 or a 1 to 100 scale may be used, a graph or pie chart may be used to show percentages, etc. Additionally or alternatively, the readability metric may be color coded. For example, the fluency metric may indicate that an electronic document has a high fluency metric by displaying a green shape, a low fluency metric by displaying a red shape, and a medium fluency metric by displaying a yellow shape. Other indicators may also be implemented to indicate fluency metrics of an electronic document such as haptic indicators, audio indicators, alternative visual indicators (shapes, graphs, bars, etc.). According to another example a category-based scale may be implemented. Such a category scale may include categories such as: simple (e.g., common vocabulary, simple language, accessible to children), standard (e.g., accessible books and magazines), advanced (e.g., broadsheet newspapers) and complex (e.g., highly domain specific papers, technical publications).

The fluency metric is a value based score determined on the basis of text complexity. The fluency metric positions a document on a complexity spectrum and provides an estimation of how difficult analyzed text will be for an audience to understand. If the value calculated for the fluency metric is not what an author intends, additional suggestions may be presented to the author to enhance and/or simplify a document's text.

The fluency metric is calculated by combining a plurality of linguistic features that are present in complex text. These features may include the percentage of rare words used, keywords suggesting multiple clauses (e.g., because, although, whenever, etc.), sentence length, presence of punctuation, conjunctions, and relative pronouns, and negations, among others. The fluency metric is scalable to a variety of languages, with each feature utilized in calculating a value for the metric being language-specific.

The fluency metric provides advantages such as allowing authors to monitor their metric scores and adjust text accordingly, adding a level of extensibility to designated target audience group rules (e.g., assessing whether an author's writing is appropriate for a designated target audience), providing the ability to identify writing inconsistency in document collaboration scenarios, and providing metric data in the form of metadata that can be provided to document analysis engines that analyze one or more documents and determine patterns and other information that can be used for improving collaborative documents thus increasing the impact of documents for their desired purpose.

According to yet another aspect, the proofing task pane may display an indication of an electronic document's compliance with one or more of: spelling and grammar, consistency, inclusive language, privacy, and branding requirements. Moreover, some, if not all, of the rules and guidelines which are utilized by an electronic document analysis engine, results of which are indicated by the proofing task pane, may be customizable, either by an enterprise or organization (e.g., an administrator, manager, professor, etc.), or by an individual. Customization may be performed from within the pane or elsewhere.

According to other aspects, the proofing task pane also displays customizable organization guidelines reflecting additional rules that may be imposed by a user's enterprise or the user as well as an easily discernible fluency metric reflecting the degree to which a document is tailored to a specified target audience or a specific reader. According to examples a user may set a writing style for an electronic document such that the proofing pane will identify issues as they relate to that writing style. For example, a user may set a writing style for an electronic document such as legal, marketing, university paper (e.g., humanities, sciences), etc. and the systems and methods described herein may analyze the electronic document for issues based on a set of rules and guidelines based on that set writing style and reflect them in the proofing task pane accordingly.

According to other examples the systems and methods described herein may identify, flag, group and display or otherwise indicate in the proofing task pane results from the application of an "inclusive language" rule or guideline. For example, the proofing task pane may indicate that there are inclusive language issues in an electronic document that may not be in compliance with personalized organization guidelines (e.g., an electronic document may contain the word "Latino" and suggestions may be made via the proofing task pane to change that word to an approved organization word or term such as "Hispanic".

According to other examples the systems and methods described herein may identify, flag, group and display or otherwise indicate in the proofing task pane results from the application of a "privacy" rule or guideline. For example, the proofing task pane may indicate that there are privacy issues in an electronic document that may not be in compliance with personalized organization guidelines (e.g., an electronic document may contain the name "Kip Harper" and suggestions may be made via the proofing task pane to change that flagged name [e.g., that name may be an identified client or minor name] to an approved organization name or term such as "client X" or "MINOR".

According to another example the systems and methods described herein may identify, flag, group and display or otherwise indicate in the proofing task pane results from the application of a "branding" rule or guideline. For example, the proofing task pane may indicate that there are branding issues in an electronic document that may not be in compliance with personalized organization guidelines (e.g., an electronic document may contain the term "the institute" and suggestions may be made via the proofing task pane to change the flagged term to an approved organization term).

Accordingly, the proofing task pane provides a single user interface that concisely displays a summary of a variety of issues pertaining to an electronic document. The proofing task pane allows a user to quickly and efficiently gauge the amount of identified issues that remain in an electronic document as a user corrects those issues. The task pane also provides an efficient interface to correct those issues.

The proofing task pane is not limited to correcting issues sequentially through an electronic document but allows a user to utilize an overview of identified issues to decide which issues (or categories of issues) to correct depending on what is important to a user, which issues (or categories of issues) catch a user's attention, which category of identified issues has the most or least amount of identified issues, which identified issues have been flagged based on organization rules and guidelines, which identified issues (or categories of issues) have a highest urgency assigned to them, etc. The proofing task pane further provides a coaching mechanism by which users (e.g., students) receive a scorecard for their writing in the form of an overview. Administrators, managers, professors and educators can thus direct employees, students and other users of the systems and methods described herein to a dashboard and overview provided by the proofing task pane and ask those users to focus on one or more specific areas of interest.

Documents, as referred to herein may be any document such as, for example, financial documents, marketing documents, emails, SMS messages, slide show documents, spreadsheet documents, web-based applications, strategic organization documents, enterprise planning documents, performance documents, agreements and contracts, sales documents, employee working documents, proposals, notes, research papers, lab results, client communications, internal communications, memoranda, etc.

References are made herein to using a word processing application to analyze documents against rules and guidelines, however other applications may also be used to analyze documents against the customized rules such as, for example, an email application, a presentation application (e.g., a slide show presentation application), a spreadsheet application, a note taking application, SMS messaging applications, and conglomerate communication applications, etc.

Aspects of the present disclosure further contemplate application of rules to documents as part of a service. In other words, aspects further include providing one or more documents to a service that can separately apply the rules to each document or parts of a document. Aspects herein may be described with reference to an enterprise organization, however it is understood that such aspects may also be applied to an individual user (e.g., a document author or reviewer), a subset of users, as well as various other entities.

Aspects may further be described with reference to rules, however and it is understood that rules may include guidelines, procedures, recommendations, etc. Such rules may relate to format, content, headers, footers and properties in the document. Properties of the document may relate to, among other properties, the location in which a document is saved, the context of a document, a type of document, embedded objects in a document, text in a document, figures in a document, etc.

FIG. 1 is an exemplary proofing task pane in a word processing application, displaying a plurality of proofing options. In this example, a word processing application 100 includes a proofing task pane 104 on the right side of an electronic document 102, including a "Writing Assistance" heading. Although the proofing task pane 104 is positioned on the right side of the display, it is understood that the proofing task pane 104 may be positioned in other locations or orientations and that one or more functions performed by and through the proofing task pane 104 may be embedded in a ribbon in an electronic document processing application. According to other examples the proofing task pane 104 may be resized and rearranged to fit devices such as smart phones and tablets, among other computing devices.

Proofing task pane 104 has a plurality of selectable proofing options including a spelling option, a grammar option and a writing assistance option, among others, with consistency proofing option 106 surrounded by a dashed line. Proofing task pane 104 may display the results of proofing performed by the word processing application 100, such as, for example, a spelling proofing option (which may be used to analyze (or simply display) the number of spelling errors within a document), a grammar spelling proofing option (which may be used analyze (or simply display) grammar-type issues such as, for example, syntax, improper contraction use, passive voice, and homonym use issues, etc.) and a writing assistance proofing option.

The writing assistance proofing option may include a plurality of style-oriented proofing options (or sub options) including a consistency proofing option 106 (which may be used to analyze a document, in an example, for consistent use of hyphenated or unhyphenated words or terms and to determine whether content in an electronic document is consistent with organization guidelines and preferences), a clarity and conciseness proofing option (not numbered) (which may be used to analyze a document, in an example, for run-on sentences, complex sentences, complex word usage, and other issues affecting a document's clarity or conciseness), a vocabulary choice proofing option (not numbered) (which may be used to analyze a document, in an example, for words or terms that are not suitable for a target audience), an inclusive language proofing option (not numbered) (which may be used to analyze words and terms, in an example, for language that is considered to exclude particular groups of people), and a formal language proofing option (not numbered) (which may be used to analyze words or terms, in an example, that are overly formal or less informal for an intended target audience), each of which is shown in FIG. 1 as a sub-heading of the writing assistance proofing option in proofing task pane 104. It is understood that although particular guidelines are illustrated and described, other guidelines could also be incorporated in the proofing task pane 104.

Accordingly, the proofing task pane 104 displays numbers (or count values) associated with the one or more of the proofing options. In this example, proofing task pane 104 displays numbers to the left of each of the spelling proofing option, the grammar proofing option, the writing assistance option and each of the style-oriented proofing options included in the writing assistance proofing option. Although the numbers are displayed directly to the left of each option, it is understood that the numbers or other indicators may be displayed in different positions or orientations. Alternatively or additionally, the displayed numbers or the surrounding environment may be displayed in one or more colors to differentiate the spelling proofing option, the grammar proofing option, and the style-type proofing options. Those colors may also correspond to a visual indicator of the issue type in the document 102. For example, a spelling error may be found in document 102, which may then be underlined or otherwise highlighted in red, a grammar issue may be found in document 102 which, may then be underlined or otherwise highlighted in blue, and a style-type issue may be found in document 102, which may then be underlined or otherwise highlighted in yellow. Other colors or visual indicators may also be used.

According to an example, if a user edits the document such as document 102, the user may correct, choose to ignore, or otherwise modify one or more flagged issues in the document 102 corresponding to one or more of the proofing options. Upon modifying a portion of the document 102 corresponding to one or more of the identified issues, the document 102 may be re-analyzed and a determination made that the modification increased or decreased the number of issues corresponding to one or more proofing issue types, and the associated number corresponding to the one or more proofing issue types may be updated in the proofing task pane 104 to indicate this to a user. Consequently, the user receives relatively immediate feedback regarding the document 102 and potential issues in the document 102 based on the user's modifications.

Figure 2:
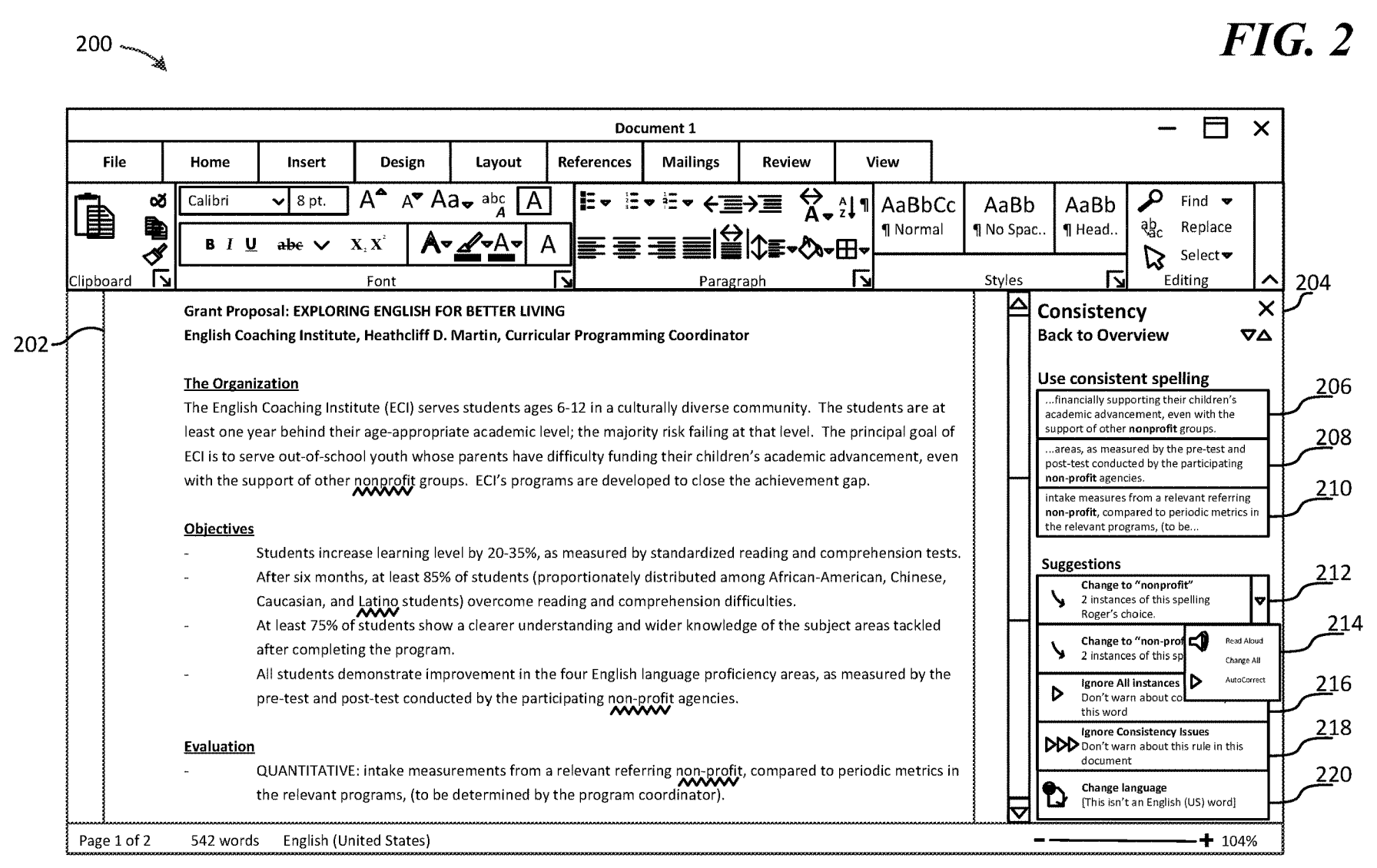

As described herein, proofing task pane 104 may also include readability metrics that may be personalized such that a user may tailor their document to suit their target audience (e.g., scholastic, inter-office memo, medical journal, legal, marketing, etc.). Proofing task pane 104 also includes organization guidelines, a group issues by page drop down menu, and paginated issue list. Organization guidelines allow a user to track compliance in document 102 to a "personalized" set of organization guidelines, i.e., guidelines that may be enterprise specific, user specific, group specific, or otherwise. The "group issues by page" drop down menu may allow a user to navigate, review and fix issues linearly or grouped by issue category. For example, a paginated issue list is may provide a list (that, in some cases may be a scrollable list) which highlights any issues that have been found to occur on individual pages in the document 102. By selecting, (e.g., left clicking with a mouse, hovering over a word or phrase, long clicking, etc.) the consistency proofing option 106 as indicated by the dashed line, a user may cause the word processing application to generate and display consistency drill-in pane 204 as shown in FIG. 2 (also shown in an enlarged view in FIG. 4) which may replace the display area previously occupied by the proofing task pane 104 as shown in FIG. 2. In this example, the consistency drill-in pane may provide suggestions for fixing consistency proofing issues identified within the document 102, and a user interface for selecting one or more suggestions to modify the document 102 if one or more of those suggestions is selected as discussed herein. As will be appreciated, the example drill-in pane 204 relating to consistency is but one example of many potential drill-in panes that may be provided via the systems and methods described herein.

Turning to FIG. 2, based on a user's selection of a consistency proofing option 106 in FIG. 1 the consistency drill-in pane 204 is displayed in the display area that was previously occupied by the proofing task pane 104. In other embodiments, the consistency drill-in pane 204 only occupies a portion of the proofing task pane 104. Consistency indicators 206, 208 and 210 within a generated consistency drill-in pane 204 for identifying and displaying flagged consistency issues within the document 202 are displayed. As a user traverses the document 202 utilizing the consistency drill-in pane 204, each of the identified consistency issues in the document 202 may be highlighted in the document 202 as shown in the document 202 with underlined consistency issue words "nonprofit," "non-profit".

FIG. 2 also illustrates the additional functionality of the proofing pane 204 for viewing, correcting or ignoring inconsistent uses of one or more identified consistency issues identified in an electronic document 202 in a word processing application 200. The proofing pane 204 may display options related to each of the identified consistency issues in document 202. Such options may include a first option 212 to change instances of "non-profit" to "nonprofit," and a second option 214 to change instances of "nonprofit" to "non-profit," including a "Read-Aloud" option, a "Change All" option and an "Auto Correct" option displayed in a pop-out window. Selection of the "Read-Aloud" option will cause the application to read alternate option "non-profit" through a speaker in communication with a computing device accessing the word processing application. Selection of either the "Change All" option or the "Auto Correct" option will further cause the application to change all instances of "nonprofit" within the document 202 to "non-profit." Choosing the "Auto Correct" option will also modify, in an existing auto correct tool, the term to change for future instances of this word or term in document 202.

Additional options shown in proofing pane 204 include a third option 216 to ignore all identified consistency issues related to the words "non-profit" and "nonprofit" in document 202, a fourth option 218 to ignore all consistency issues identified in document 202 and a fifth option 220 to change the language (e.g., to translate an identified word or term identified as a consistency issue in document 202 to another language).

FIG. 3 is a menu 306 associated with a proofing task pane 304 for selectively activating and deactivating selectable grammar-based options associated with an electronic document 302 in a word processing document 300. According to examples a user may select "Grammar" in proofing pane 304 and a menu 306 may be displayed with selectable options relating to analyzing and flagging grammar issues in document 302. Menu 306 may provide selectable options for turning on or off flagging and highlighting of grammar issues in document 302 as well as selectable options for what types of grammar issues may be flagged, highlighted and provided to a user via proofing pane 304. Exemplary types of grammar issues that a user may select for flagging, highlighting and being provided with in proofing pane 304 via menu 306 include capitalization, capitalization in sentences, hyphenation, misused words, noun phrases, punctuation, spacing, subject-verb agreement and verb phrases.

Menu 306 includes indicator 308, which may be provided next to each of the exemplary types of grammar issues that a user may select for flagging, highlighting and being provided with in proofing pane 304. The indicator provides a viewable mechanism by which users are alerted to the types of issues that an organization, manager, professor, etc., have made mandatory or suggestive for a specific type of issue. That is, an organization, manager, professor, etc., may provide guidelines (via word processing application 200) by which a user must mandatorily comply with in utilizing the proofing pane 204 in checking a document for flagged issues.

According to the example provided in FIG. 3, the menu 306 indicates that an organization, manager, professor, etc., has provided that capitalization, hyphenation, misused words, punctuation and subject-verb agreement issues identified in document 302 must be flagged in document 302 and provided to a user via proofing pane 304.

Although menu 306 is provided in the context of grammar issues, menus providing similar functionality may also be provided after selection of other options in the proofing pane 304 such as a spelling option, a writing assistance option, a consistency option, a clarity and conciseness option, a vocabulary choice option, an inclusive language option, a formal language option and an organization guidelines option, among others.

FIG. 4 is an enlarged view of an exemplary consistency drill-in proofing task pane 400. The consistency drill-in proofing task pane 400 may be displayed in or adjacent to an electronic document. In this example, once a user has selected consistency proofing option 106 shown in FIG. 1, additional functionality of the proofing pane 104 for viewing, correcting or ignoring inconsistent uses of one or more identified consistency issues identified in the electronic document 102 in a word processing application 100 may be provided. The consistency drill-in proofing task pane 400 may display identified instances of inconsistent terminology in document 102 such as instances 402, 404 and 406. The drill-in proofing task pane 400 may also display suggestions 408 including selectable options related to each of the identified consistency issues in document 102. Such options may include a first option 410 to change instances of "non-profit" to "nonprofit," and a second option 412 to change instances of "nonprofit" to "non-profit," including a "Read-Aloud" option, a "Change All" option and an "Auto Correct" option displayed in a pop-out window 420. Selection of the "Read-Aloud" option will cause the application to read alternate option "non-profit" through a speaker in communication with a computing device accessing the word processing application. Selection of either the "Change All" option or the "Auto Correct" option will further cause the application to change all instances of "nonprofit" within the document 102 to "non-profit." Choosing the "Auto Correct" option will also modify, in an existing auto correct tool, the term to change for future instances of this word or term in document 102.

Additional options shown in consistency drill-in proofing task pane 400 include a third option 414 to ignore all identified consistency issues related to the words "non-profit" and "nonprofit" in document 102, a fourth option 416 to ignore all consistency issues identified in document 102 and a fifth option 418 to change the language (e.g., to translate an identified word or term identified as a consistency issue in document 102 to another language).

Figure 5:
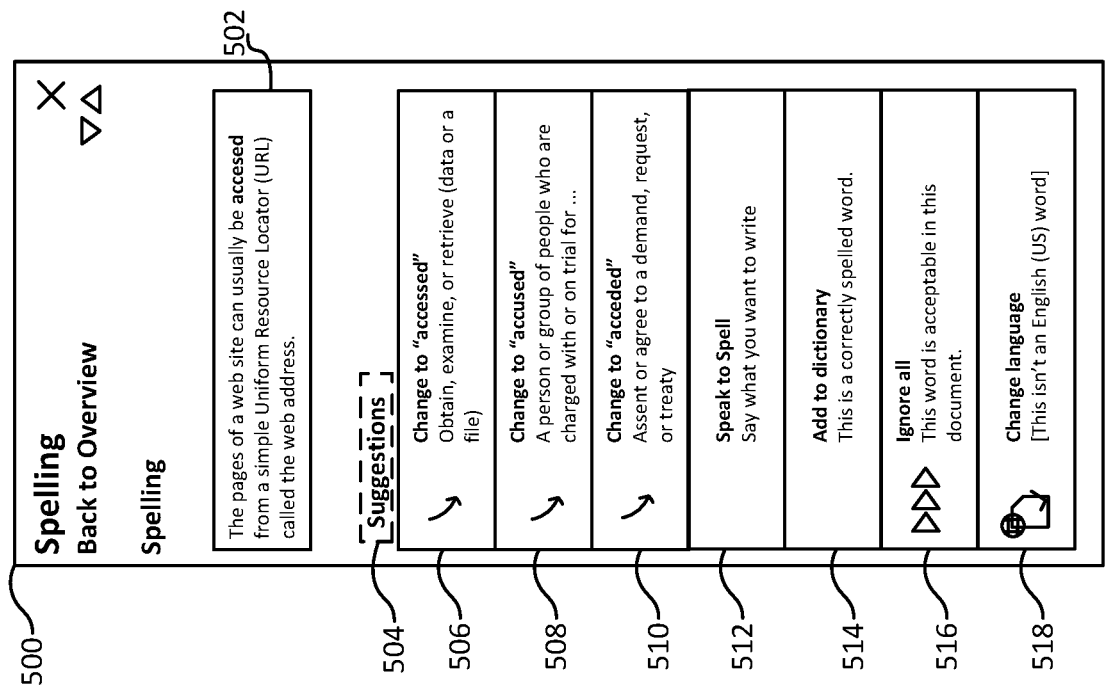
FIG. 5 is an enlarged view of an exemplary spelling drill-in proofing task pane which may be displayed in or adjacent to an electronic document.

FIG. 5 is an enlarged view of an exemplary spelling drill-in proofing task pane 500. The spelling drill-in proofing task pane 500 may be displayed in or adjacent to an electronic document. In this example, once a user has selected a spelling option (e.g., the spelling option shown in proofing task pane 104 shown in FIG. 1), additional functionality of the proofing task pane for viewing, correcting or ignoring spelling issues identified in an electronic document in a word processing application may be provided. The spelling drill-in proofing task pane 500 may display identified instances of misspelled words in an electronic document such as identified misspelled instance 502, which is shown contextually with its surrounding text from an electronic document.

The drill-in proofing task pane 500 may display suggestions 504 including selectable options related to each of the identified spelling issues in an electronic document. Such options may include a first option 506 to change an identified possible misspelled word such as "acessed" to "accessed," a second option 508 to change the possible misspelled word "acessed" to "accussed," a third option 510 to change the possible misspelled word "acessed" to "acceded," a fourth option 512 to "Speak to Spell," a fifth option 514 to add the possible misspelled word "acessed" to a dictionary in the word processing application, a sixth option 516 to ignore all identified spelling issues related to the possibly misspelled word "acessed" in an electronic document and a seventh option 518 to change the language for possibly misspelled word "acessed" within an electronic document.

According additional examples, the fourth option 512 ("Speak to Spell") may allow a user to verbally indicate, by way of a microphone connected to a computing device on which a word processing application is operating, a word, term or phrase the user would like to add to an electronic document or otherwise see within a suggestion list in the spelling drill-in proofing task pane 500 as a possible replacement suggestion for a flagged word (e.g., "acessed"). This feature may allow a spoken word, term or phrase to completely replace previously generated suggestions (e.g. first suggestion 505, second suggestion 508 and third suggestion 510), add a spoken word, term or phrase to suggestions 504, or cause a word processing application to highlight or otherwise emphasize one of the suggestions corresponding to a spoken word, term or phrase.

The fifth option 514 ("Add to dictionary"), if selected, may provide the ability to add a flagged word or term to a dictionary of words that the word processing application will not flag in the future. For example, if misspelled word "acessed" is added to the dictionary using the fifth option 514, any future instance of the word "acessed" will not be flagged by the word processing application as being a misspelled word.

The sixth option 516 ("Ignore all"), if selected, may provide the ability to ignore every instance of a flagged word or term within an electronic document. In embodiments, this functionality does not apply to subsequently created documents, however, in other embodiments, this selection may apply to subsequent documents.

The seventh option 518 ("Change language"), if selected, may provide the ability to change displayed contextual information (e.g., a definition) in the spelling drill-in proofing task pane 500 for a flagged issue such as the flagged word "acessed". For example, a user may select seventh option 518 if a flagged word appears to the user to be correct in its context but it has been flagged because it is a non-English word. Thus, if the seventh option 518 ("Change language") is selected, the spelling drill-in proofing task pane 500, if selected, may display a definition for a flagged word based on a determined definition for that word in a non-English language. The ability to change the definition language for the flagged grammar issue provides users whose first language is something other than English the opportunity to gain additional context for a flagged issue or word in the user's native language.

Figure 6:
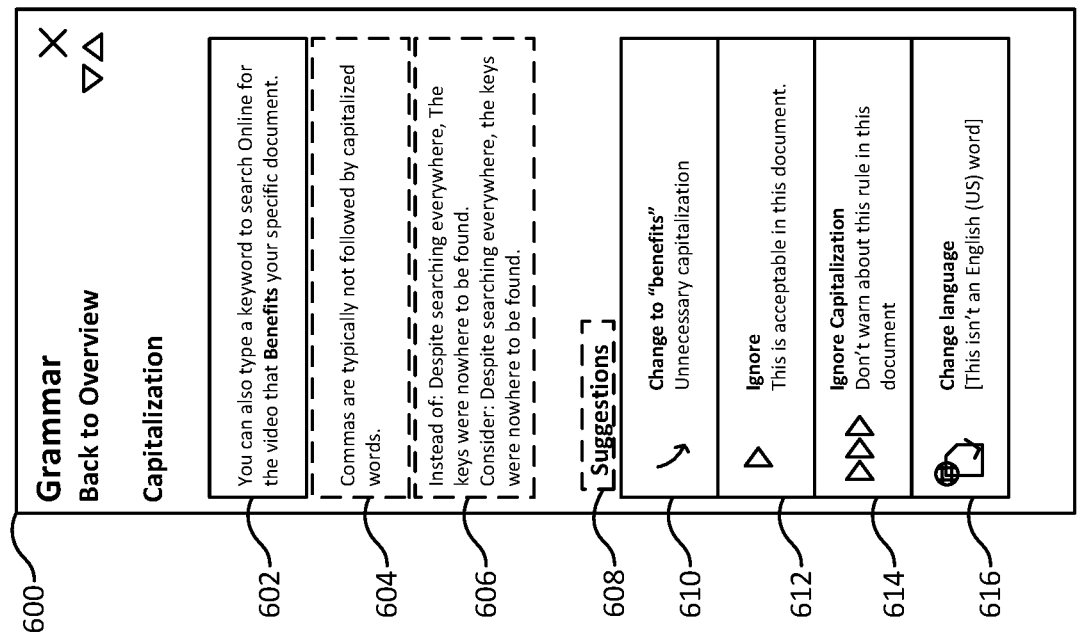
FIG. 6 is an enlarged view of an exemplary grammar drill-in proofing task pane which may be displayed in or adjacent to an electronic document.

FIG. 6 is an enlarged view of an exemplary grammar drill-in proofing task pane 600. The grammar drill-in pane 600 may be displayed in or adjacent to an electronic document. In this example, once a user has selected a grammar option (e.g., the grammar option shown in proofing task pane shown in FIG. 1), additional functionality of the proofing task pane for viewing, correcting or ignoring grammar issues identified in an electronic document in a word processing application may be provided. The grammar drill-in pane 600 may display identified instances of grammar issues in an electronic document, such as identified grammar issue 602, which are shown contextually with their surrounding text from an electronic document. Grammar drill-in pane 600 may also display explanations 604 related to identified grammar issues and verbose suggestions 606 for replacing identified grammar issues.

The drill-in proofing task pane 600 may display suggestions 608 including selectable options related to each of the identified grammar issues in an electronic document. Such options may include a first option 610 ("Change to 'benefits'"), which if selected, may provide the ability to change an identified grammar issue such as the word "Benefits" in the middle of a sentence to "benefits," a second option 612 ("Ignore"), which if selected, may provide the ability to ignore a single instance of a flagged word or term within an electronic document, a third option 614 ("Ignore Capitalization"), which if selected, may provide the ability to ignore all capitalization-type grammar issues in an electronic document and a fourth option 616 ("Change language"), which if selected, may provide the ability to change displayed contextual information (e.g., a definition) in the grammar drill-in proofing task pane 600 for a flagged issue such as the flagged word "Benefits". For example, a user may select fourth option 616 if a flagged word appears to the user to be correct in its context but it has been flagged because it is a non-English word. Thus, if the fourth option 616 ("Change language") is selected, the grammar drill-in proofing task pane 600 may display a definition for a flagged word based on a determined definition for that word in a non-English language. The ability to change the definition language for the flagged grammar issue provides users whose first language is something other than English the opportunity to gain additional context for a flagged issue or word in the user's native language.

Figure 7:
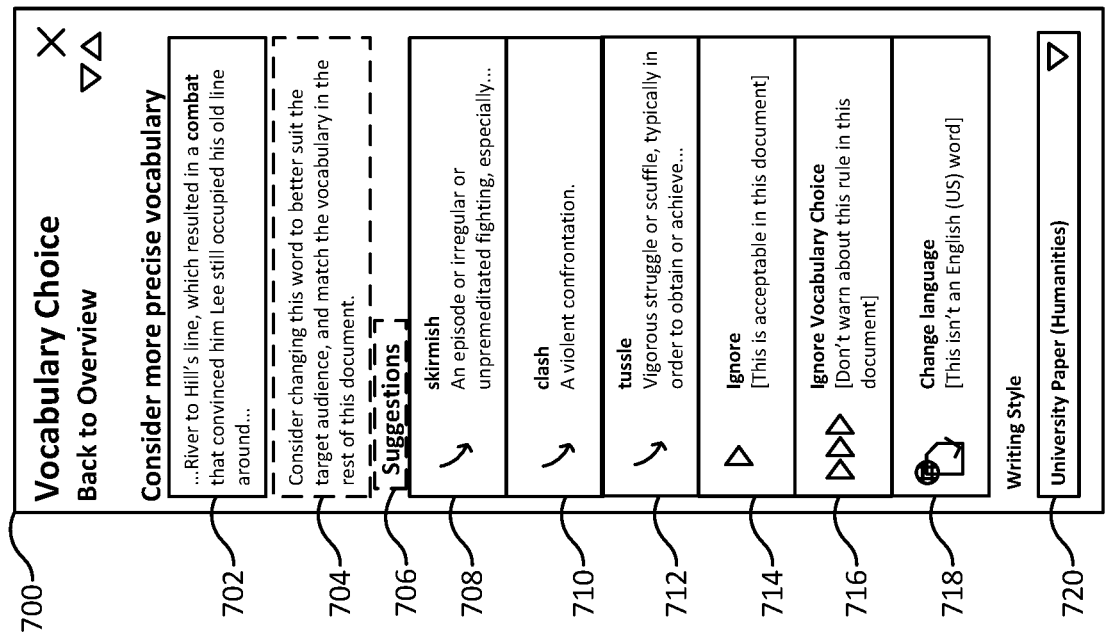
FIG. 7 is an enlarged view of an exemplary vocabulary choice drill-in proofing task pane which may be displayed in or adjacent to an electronic document.

FIG. 7 is an enlarged view of an exemplary vocabulary choice drill-in proofing task pane 700. The vocabulary choice drill-in proofing pane 700 may be displayed in or adjacent to an electronic document. In this example, once a user has selected a vocabulary choice option (e.g., the vocabulary choice option shown in proofing task pane shown in FIG. 1), additional functionality of the proofing task pane for viewing, correcting or ignoring vocabulary choice issues identified in an electronic document in a word processing application may be provided. The vocabulary choice drill-in pane 700 may display identified instances of vocabulary choice issues in an electronic document such as identified vocabulary choice issue 702, which is shown contextually with its surrounding text from an electronic document. Vocabulary choice drill-in proofing pane 700 also includes contextual information 704 providing a user with further explanation regarding identified vocabulary choice issue 702. In this instance contextual information 704 indicates that changing the word "combat" in its context may better suit the target audience and match the vocabulary in the rest of an electronic document.

The drill-in proofing task pane 700 may display suggestions 706 including selectable options related to each of the identified vocabulary choice issues in an electronic document. Such options may include a first option 708, a second option 710 and a third option 712 to change the flagged word "combat" to better suit the target audience, as well as a fourth option 714 ("Ignore"), a fifth option 716 ("Ignore vocabulary choice") and a sixth option 718 ("Change language"), which provide similar functionality as described with regard to FIGS. 4-6.

A seventh option 720 is also provided for selecting a writing style by which the systems and methods described herein will analyze an electronic document for vocabulary choice issues. That is, seventh option 720 provides a drop down list of writing styles (e.g., university paper (humanities), university paper (sciences), legal, marketing, etc.), which if selected, provide a set of rules or guidelines by which an electronic document will be analyzed for conformance to a set of rules or guidelines corresponding to the selected writing style.

FIG. 8 is an exemplary proofing task pane 804 further illustrating a user interface in a word processing application 800 indicating an electronic document 802 complies with all applied rules. Proofing task pane 804 has a plurality of selectable proofing options, readability metrics and organization guidelines. The readability metrics include a fluency index of "MED" indicating that the document 802 is tailored to a medium degree for the selected target audience. Each of the plurality of selectable proofing options has an associated zero directly to its left indicating that there are no issues left to resolve in those categories. There is also a popup window 808 displayed over the document 802 and an indicator 806 in the proofing task pane 804 indicating that the proofing check is complete and there are no proofing issues left to resolve.

Figure 9:
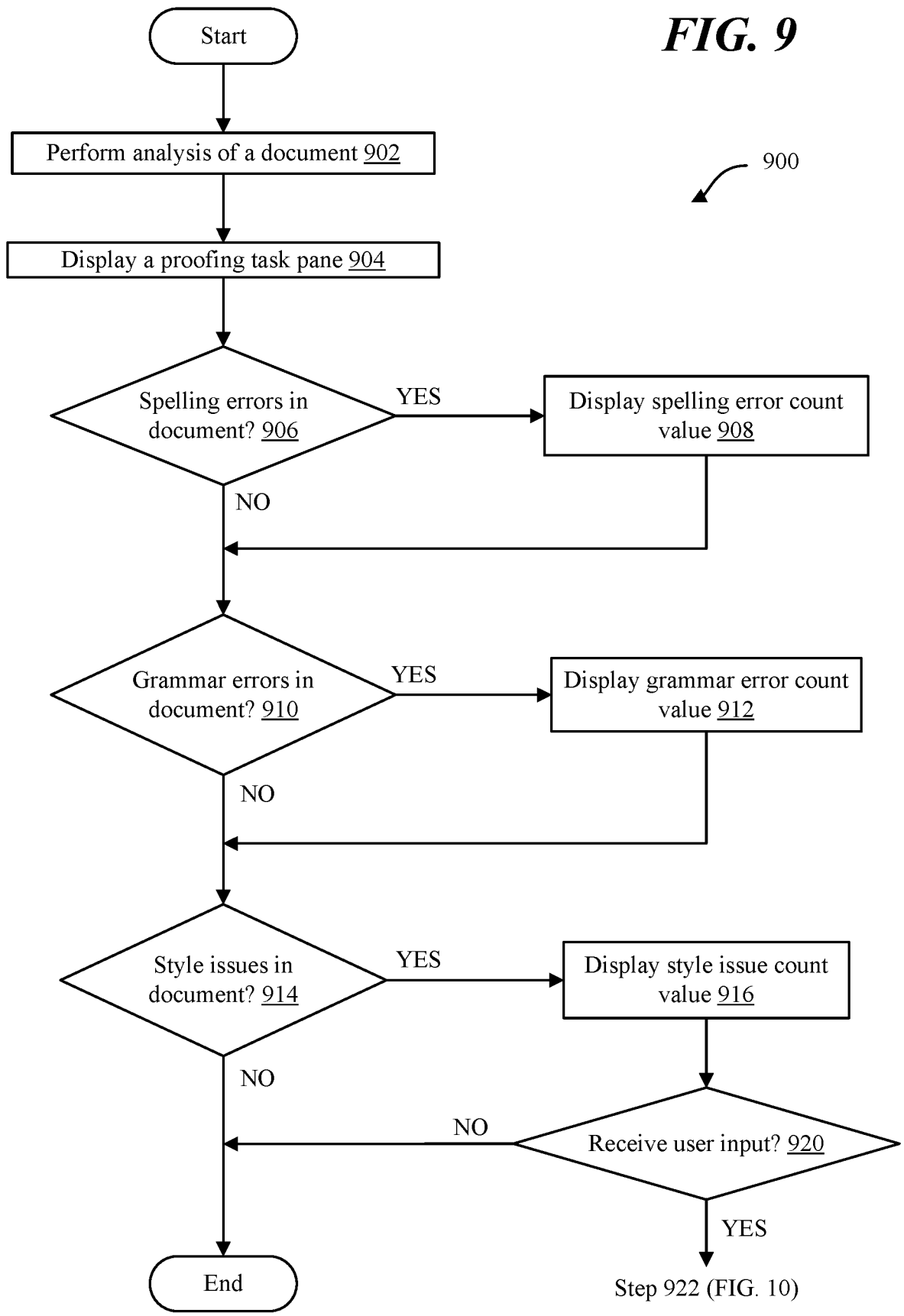
FIG. 9 and FIG. 10 depict an exemplary method for iterating a counter of a proofing task pane in an electronic document processing application.
Figure 10:
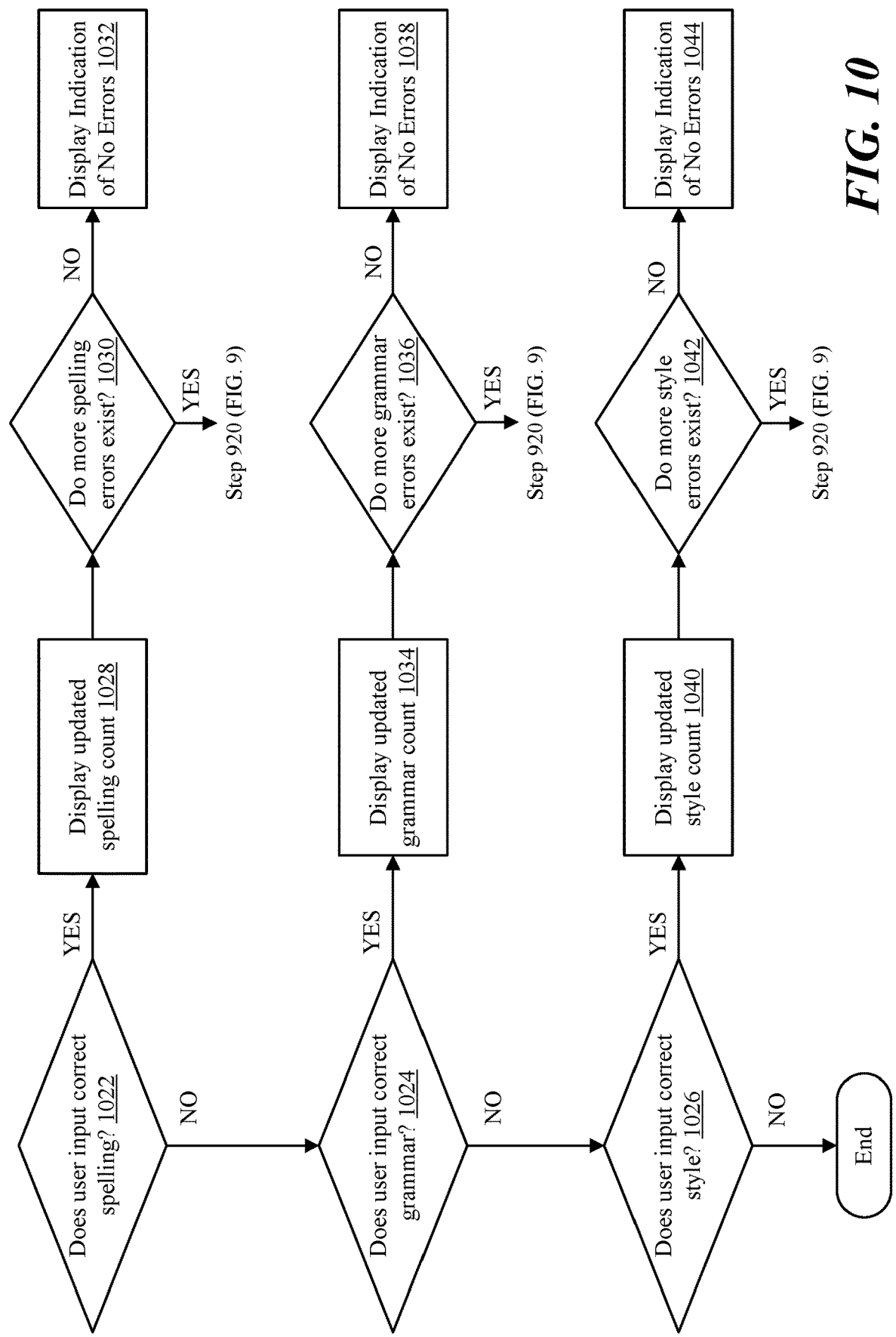

FIG. 9 and FIG. 10 depict a flowchart representing a method 900 for providing a proofing task pane within a word processing application. Flow begins at operation 902 where a document is analyzed for errors corresponding to a plurality of issue types, such as spelling issues, grammar issues, and writing assistance issues (i.e., style issues) including consistency issues, clarity and conciseness issues, vocabulary choice issues and formal language issues shown in proofing task pane 102 depicted in FIG. 1.

According to aspects an entire open document in a word processing application such as document 102 may be analyzed for a plurality of issues. From operation 902 flow continues to operation 904 where a proofing task pane is displayed. The proofing task pane may display a plurality of issue types, and may distinguish the spelling issues, the grammar issues and the writing assistance issues in different colors within the proofing task pane. Identified issues for those issue types may also be underlined or otherwise highlighted within the analyzed document 102 with colors corresponding to their issue type color within the proofing task pane 104. Each of the plurality of issue types may also be graphically associated with a corresponding counter within the proofing task pane. For example, if one spelling error is found within the document, a "1" may be displayed in a spelling counter adjacent to the proofing task pane.

From operation 904 flow continues to 906 where the word processing application may either increase the number within the spelling counter at operation 908 if spelling errors were found in the document before moving to operation 910 or move directly to operation 910 if no spelling errors exist in the document.

At operation 910 the word processing application may either increase the number within the grammar counter at operation 912 if grammar errors were found in the document before moving to operation 914 or move directly to operation 914 if no grammar issues exist in the document.

At operation 914 the word processing application may either increase the number within the style counter at operation 916 if style errors were found in the document before moving to an end operation. If spelling errors, grammar errors and/or style errors were found to exist at operations 906, 910 and 914, respectively, a further determination is made at operations 920, 1022, 1024 and 1026 whether user input is received to correct or ignore those errors.

If a user does not correct or ignore spelling errors at 1022 the flow moves to operation 1024 where a determination is made as to whether user input is received to correct or ignore grammar errors. If a user does not correct or ignore the grammar errors the flow moves to operation 1026 where a determination is made as to whether user input is received to correct or ignore style errors. If a user does not correct or ignore the style errors the flow moves to and end operation.

Turning back to operation 1022, if user input corrects spelling errors, flow moves to operation 1028 where the number in the spelling counter is decreased accordingly. Flow then moves to operation 1030 where a determination is made as to whether more spelling errors exist in the document. If more spelling errors are found to exist flow moves back to operation 920 in FIG. 9. If at operation 1030 no additional spelling errors are found to exist flow moves to operation 1032 and an alert such as "no spelling errors in doc." is displayed.

Turning back to operation 1024, if user input corrects grammar errors, flow moves to operation 1034 where the number in the grammar counter is decreased accordingly. Flow then moves to operation 1036 where a determination is made as to whether more grammar errors exist in the document. If more grammar errors are found to exist flow moves back to operation 920 in FIG. 9. If at operation 1036 no additional spelling errors are found to exist flow moves to operation 1038 and an alert such as "no grammar issues in doc." is displayed.

Turning back to operation 1026, if a user input corrects style errors, flow moves to operation 1040 where the number in the style counter is decreased accordingly. Flow then moves to operation 1042 where a determination is made as to whether more style errors exist in the document. If more style errors are found to exist flow moves back to operation 920 in FIG. 9 and the method continues. If at operation 1042 no additional style errors are found to exist flow moves to operation 1044 and an alert such as "no style errors in doc." is displayed.

Figure 11:
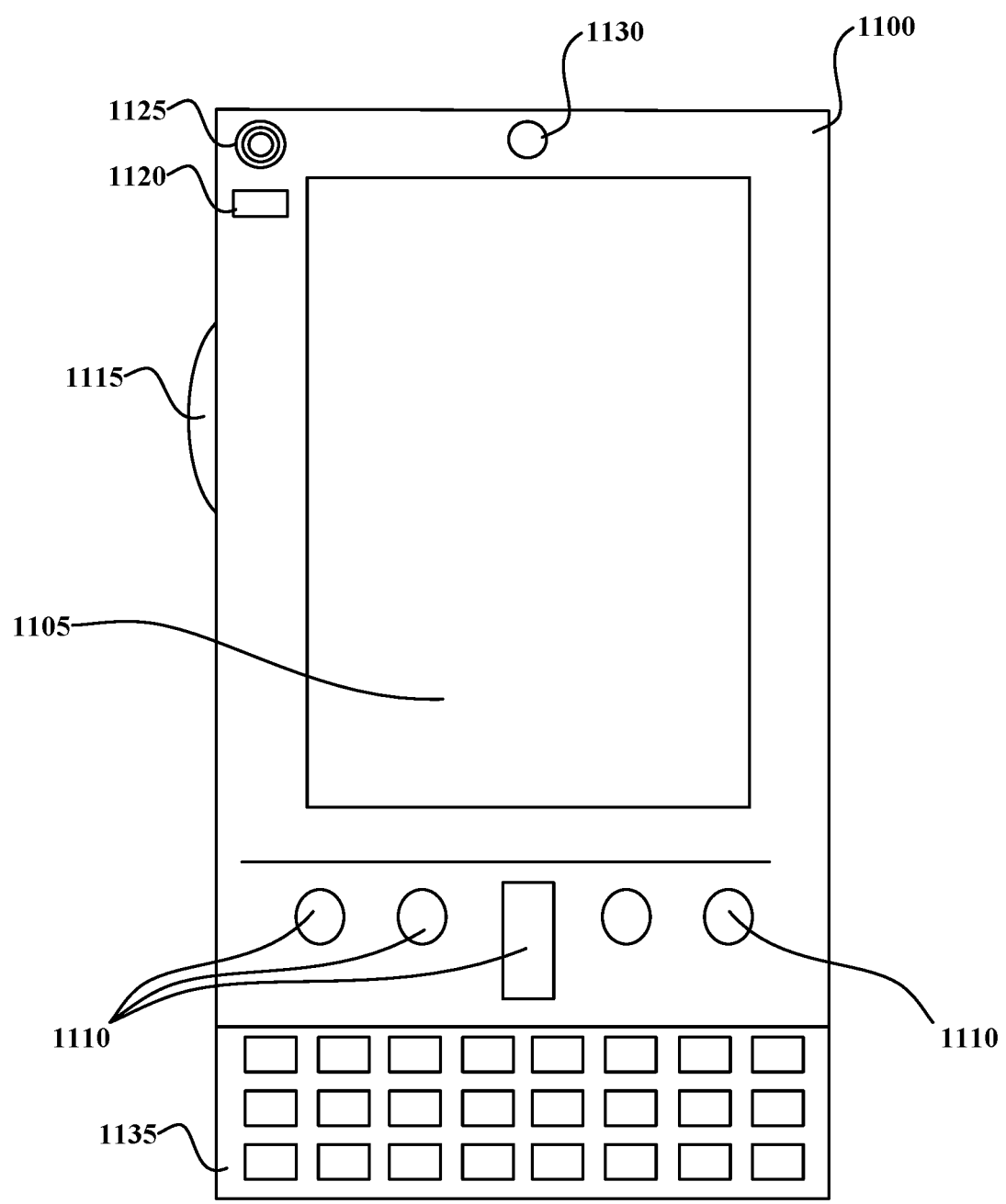
FIG. 11 illustrates an exemplary computing device for executing one or more aspects of the present disclosure.
Figure 12:
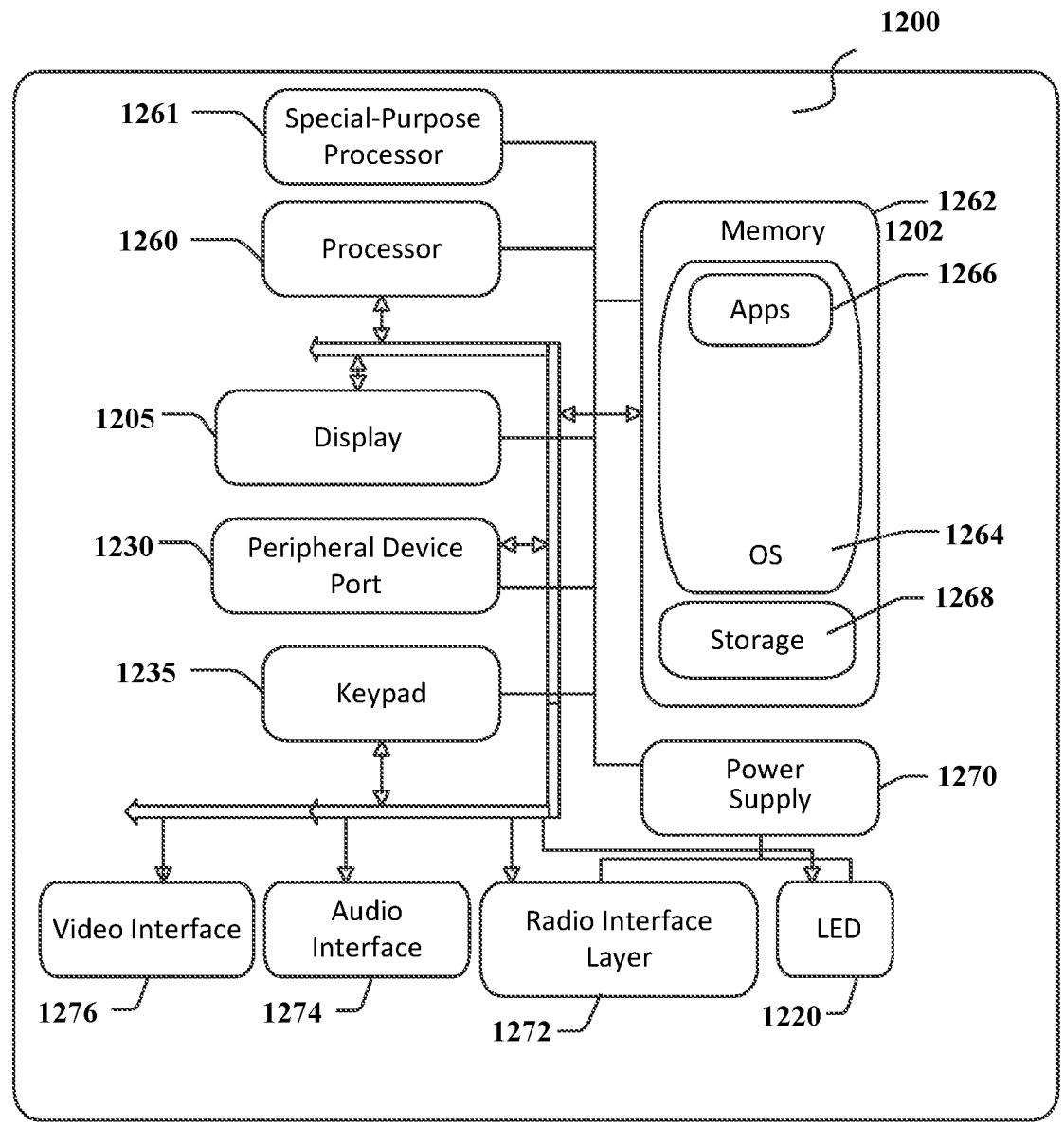
FIG. 12 is a simplified block diagram of an exemplary computing device with which aspects of the present disclosure may be practiced.

FIG. 11 and FIG. 12 illustrate computing device 1100, for example, a mobile telephone, a smart phone, a tablet personal computer, a laptop computer, and the like, with which aspects of the disclosure may be practiced. With reference to FIG. 11, an exemplary mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some aspects. In yet another alternative aspect, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various aspects, the output elements include the display 1105 for showing a graphical user interface (GUI), a visual indicator 1120 (e.g., a light emitting diode) and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device. In aspects, the word processing application may be displayed on the display 1105.

FIG. 12 is a block diagram illustrating the architecture of one aspect of a mobile computing device. That is, the mobile computing device 1200 can incorporate a system (i.e., an architecture) 1202 to implement some aspects of the disclosure. In one aspect the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and a wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, diagramming applications, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored in the host computer. As should be appreciated, other applications may be loaded into the memory 1262 and run on the mobile computing device 1200, including steps and methods of reviewing a document for errors corresponding to one or more of spelling errors, grammatical errors, and style errors; displaying a task pane having a plurality of selectable options in a document processing application; and, based on the analysis of the document, displaying in the task pane a total number of the errors associated with each of the spelling errors, grammatical errors, and style errors.

The system 1202 has a power supply 1270, which may be implemented as one or more batteries. The power supply 1270 might further include an external power source, such as an AC adapter or a powered docking cradle that supplements or recharges the batteries.

The system 1402 may also include a radio 1272 that performs the functions of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1466 via the operating system 1264, and vice versa. The radio 1272 allows the system 1202 to communicate with other computing devices such as over a network. The radio 1272 is one example of communication media. Communication media may typically be embodied by computer readable instructions, data structures, program modules, or other data in a modulated data signal, such as a carrier wave or other transport mechanism, and includes any information deliver media. The term "modulated data signal" means a signal that has one or more of its characteristics set or changed in such a manner as to encode information in the signal. By way of example, not limitation, communication media includes wired media such as a wired network or direct-wired connection, and wireless media such as acoustic, RF infrared and other wireless media. The term computer readable media is used herein includes both storage media and communication media.

This aspect of the system 1202 provides notifications using the visual indicator 1120 that can be used to provide visual notifications and/or an audio interface 1274 producing audible notifications via the audio transducer 1125. In the illustrated example, the visual indicator 1120 is a light emitting diode (LED) and the audio transducer 1125 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1125, the audio interface 1274 may also be coupled to a microphone to receive audible input, such as to facilitate a telephone conversation. In accordance with aspects of the present invention, the microphone may also serve as an audio sensor to facilitate control of notifications, as will be described below. The system 1202 may further include a video interface 1276 that enables an operation of an on-board camera 1130 to record still images, video stream, and the like.

Figure 14:
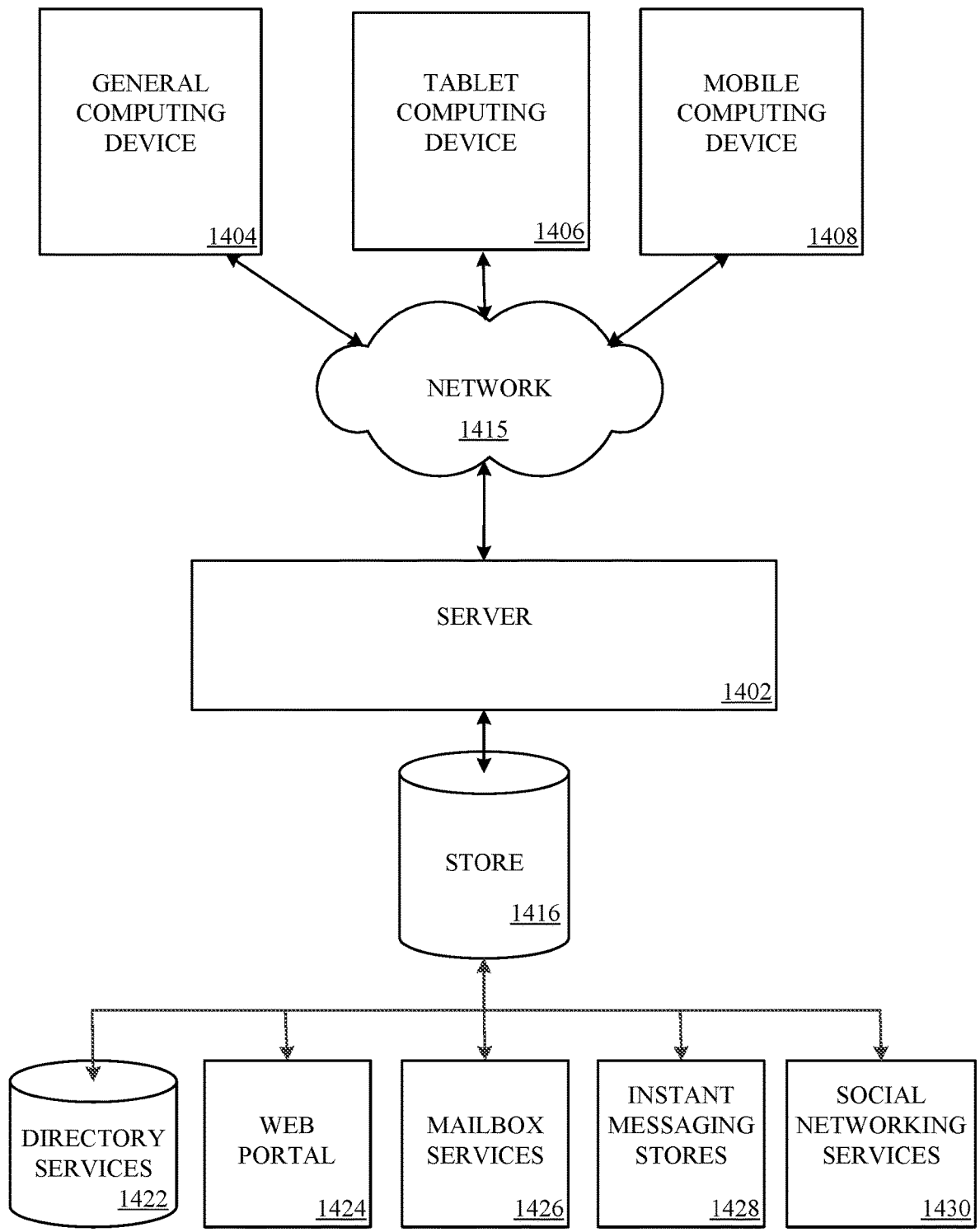
FIG. 14 is a simplified block diagram of a distributed computing system in which aspects of the present disclosure may be practiced.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 14 by the non-volatile storage area 1268. Computer storage media may include volatile and nonvolatile, removable and non-removable media implemented in any method or technology for storage of information, such as computer readable instructions, data structures, program modules, or other data.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

One of skill in the art will appreciate that the scale of systems such as system 1202 may vary and may include more or fewer components than those described in FIG. 12. In some examples, interfacing between components of the system 1202 may occur remotely, for example where components of system 1202 may be spread across one or more devices of a distributed network. In examples, one or more data stores/storages or other memory are associated with system 1202. For example, a component of system 1202 may have one or more data storages/memories/stores associated therewith. Data associated with a component of system 1202 may be stored thereon as well as processing operations/instructions executed by a component of system 1202

Figure 13:
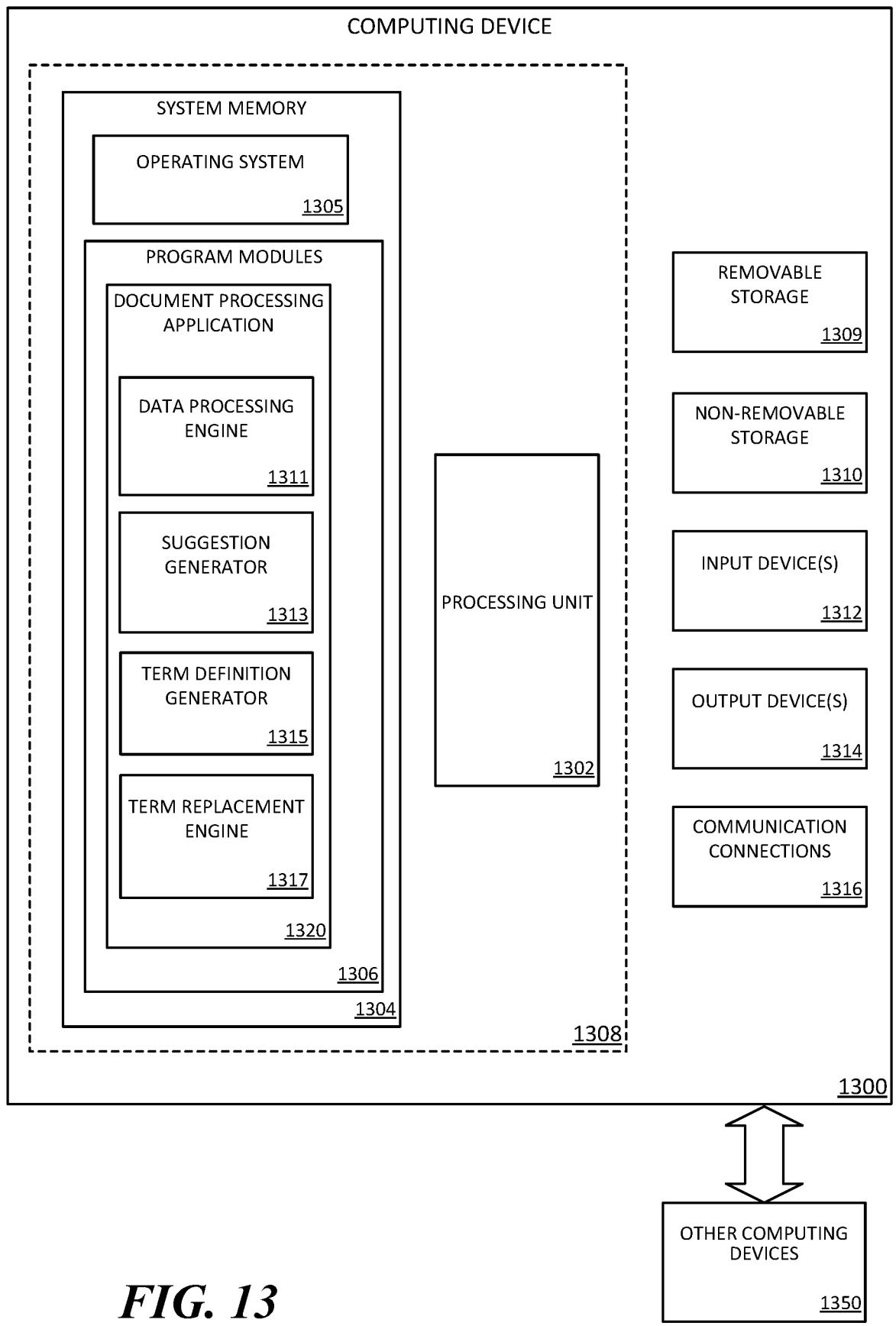
FIG. 13 is a block diagram illustrating physical components (e.g., hardware) of a computing device with which aspects of the present disclosure may be practiced.

FIG. 13 is a block diagram illustrating physical components (e.g., hardware) of a computing device 1300 with which aspects of the disclosure may be practiced. The computing device components described below may have computer executable instructions for reviewing a document for errors corresponding to one or more of spelling errors, grammatical errors, and style errors; displaying a task pane having a plurality of selectable options in a document processing application; and, based on the analysis of the document, displaying in the task pane a total number of the errors associated with each of the spelling errors, grammatical errors, and style errors, on a server computing device, including computer executable instructions for document processing application 1320 that can be executed to employ the methods disclosed herein. In a basic configuration, the computing device 1300 may include at least one processing unit 1302 and a system memory 1304. Depending on the configuration and type of computing device, the system memory 1304 may comprise, but is not limited to, volatile storage (e.g., random access memory), non-volatile storage (e.g., read-only memory), flash memory, or any combination of such memories. The system memory 1304 may include an operating system 1305 and one or more program modules 1306 suitable for document processing application 1320, such as one or more components in regards to FIG. 13 and, in particular, data processing engine 1311, suggestion generator 1313, term definition generator 1315, and term replacement engine 1317. The operating system 1305, for example, may be suitable for controlling the operation of the computing device 1300. Furthermore, aspects of the disclosure may be practiced in conjunction with a graphics library, other operating systems, or any other application program and is not limited to any particular application or system. This basic configuration is illustrated in FIG. 13 by those components within a dashed line 1308. The computing device 1500 may have additional features or functionality. For example, the computing device 1300 may also include additional data storage devices (removable and/or non-removable) such as, for example, magnetic disks, optical disks, or tape. Such additional storage is illustrated in FIG. 13 by a removable storage device 1309 and a non-removable storage device 1310.

As stated above, a number of program modules and data files may be stored in the system memory 1304. While executing on the processing unit 1302, the program modules 1306 (e.g., document processing application 1320) may perform processes including, but not limited to, the aspects, as described herein. Other program modules that may be used in accordance with aspects of the present disclosure, and in particular may include data processing engine 1311, suggestion generator 1313, term definition generator 1315 or term replacement engine 1317, etc.

According to examples, data corresponding to a document in a document processing application may be processed by data processing engine 1311 and used by suggestion generator 1313, prior to running term definition generator 1315 and term replacement engine 1317.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 13 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1300 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 1300 may also have one or more input device(s) 1312 such as a keyboard, a mouse, a pen, a sound or voice input device, a touch or swipe input device, etc. The output device(s) 1314 such as a display, speakers, a printer, etc. may also be included. The aforementioned devices are examples and others may be used. The computing device 1300 may include one or more communication connections 1316 allowing communications with other computing devices 1350. Examples of suitable communication connections 1316 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1304, the removable storage device 1309, and the non-removable storage device 1310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1300. Any such computer storage media may be part of the computing device 1300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 1304. While executing on processing unit 1302, program modules (e.g., applications, Input/Output (I/O) management, and other utilities) may perform processes including, but not limited to, one or more of the stages of the operational methods described herein such as method 900 illustrated in FIG. 9 and FIG. 10, for example.

FIG. 14 illustrates one aspect of the architecture of a system for processing data received at a computing system from a remote source, such as a personal/general computer 1404, tablet computing device 1406, or mobile computing device 1408, as described above. Content displayed at server device 1402 may be stored in different communication channels or other storage types. For example, various documents may be stored using a directory service 1422, a web portal 1424, a mailbox service 1426, an instant messaging store 1428, or a social networking site 1430. The document processing application 1306 may be employed by a client that communicates with server device 1402, and/or the document processing application 1306 may be employed by server device 1402. The server device 1402 may provide data to and from a client computing device such as a personal/general computer 1404, a tablet computing device 1406 and/or a mobile computing device 1408 (e.g., a smart phone) through a network 1415. By way of example, the computer system described above with respect to FIGS. 11-13 may be embodied in a personal/general computer 1404, a tablet computing device 1406 and/or a mobile computing device 1408 (e.g., a smart phone). Any of these embodiments of the computing devices may obtain content from the store 1416, in addition to receiving graphical data useable to be either pre-processed at a graphic-originating system, or post-processed at a receiving computing system.

Figure 15:
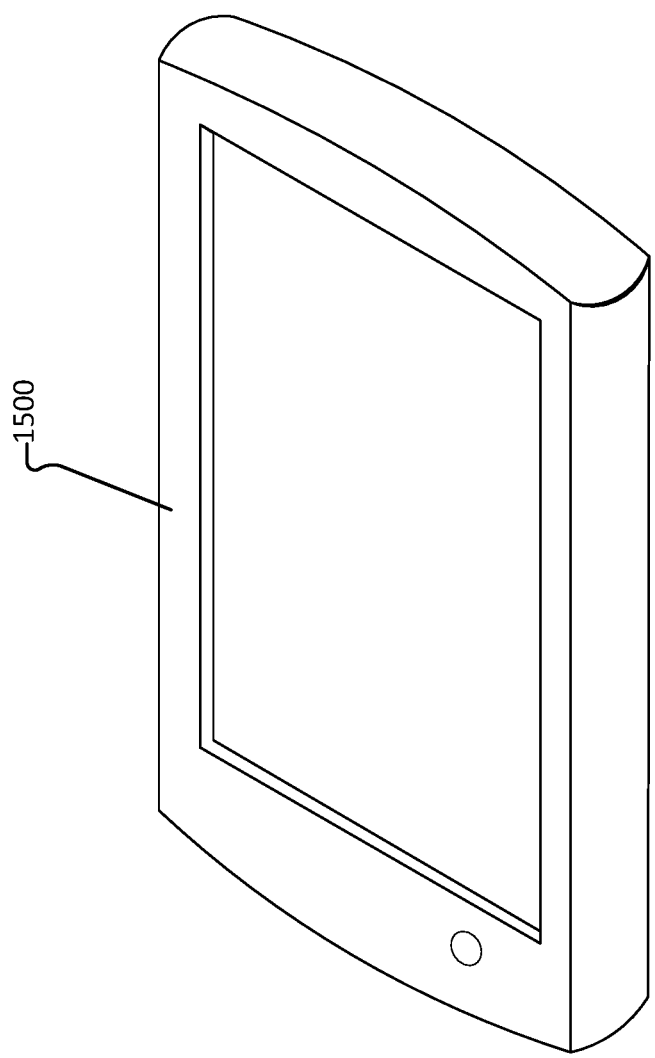
FIG. 15 illustrates a tablet computing device for executing one or more aspects of the present disclosure.

FIG. 15 illustrates an exemplary tablet computing device 1500 that may execute one or more aspects disclosed herein.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method for performing operations on a graphical user interface, comprising:
    performing an analysis of an electronic document, wherein the analysis comprises reviewing the electronic document for a plurality of style issues, a plurality of spelling issues and a plurality of grammar issues;
    displaying, in a document processing application, a proofing task pane having a plurality of selectable options contemporaneously displayed, wherein the plurality of selectable options includes a spelling option, a grammar option, an accessibility option, and a writing assistant option, wherein selecting one of the spelling option, the grammar option, the accessibility option, or the writing assistant option allows a user to fix a first issue and a second issue with one or more of: a spelling issue, a grammar issue, an accessibility issue, or a writing assistance issue, respectively, within the proofing task pane;
    based on the analysis of the electronic document, displaying in the proofing task pane, a total number of identified issues associated with each of the plurality of style issues, the plurality of spelling issues, and the plurality of grammar issues, wherein the first issue and the second issue have a first correction and a second correction, respectively, wherein the first correction and second correction are different, and wherein an application of the first correction to the analysis of the electronic document eliminates the second correction;

calculating a fluency value, based on a fluency metric associated with the electronic document; and displaying, in the proofing task pane, an indication of the fluency value for the electronic document.

2. The method of claim 1, wherein the plurality of selectable options includes a drill in menu to access the spelling option, the grammar option, the accessibility option, and the writing assistant option.

3. The method of claim 1, further comprising:

performing an accessibility analysis of the electronic document for font size, font type, font color, background color, embedded images, embedded videos and embedded audio affecting at least one of visually impaired users, audibly impaired users, and users affected with a learning disability; and displaying in the proofing task pane, based on the accessibility analysis, an indication of a number of accessibility issues identified in the electronic document.

4. The method of claim 1, further comprising analyzing the electronic document for instances of inconsistent terms and wherein the writing assistance option further comprises a consistency option.

5. The method of claim 1, further comprising analyzing the electronic document for language that is unclear and for run-on sentences and wherein the writing assistant option further comprises a clarity and conciseness option.

6. The method of claim 1, further comprising analyzing the electronic document for at least one word that does not suit an indicated target audience and wherein the writing assistance option further comprises a vocabulary choice option.

7. The method of claim 1, further comprising analyzing the electronic document for instances of inclusive language and wherein the writing assistance option further comprises an inclusive language option.

8. The method of claim 1, further comprising analyzing the electronic document for instances of formal language and wherein the writing assistance option further comprises a formal language option.

9. The method of claim 1, further comprising analyzing the electronic document for sensitive information, the sensitive information comprising person names, financial information and social security numbers, and displaying, in the proofing task pane, a privacy component, the privacy component indicating whether the electronic document contains sensitive information including person names, financial information and social security numbers.

10. The method of claim 1, further comprising analyzing the electronic document for instances of inconsistent branding terms and displaying, in the proofing task pane, a branding component, the branding component indicating whether the electronic document contains one or more instance of an inconsistent branding term.

11. The method of claim 1, further comprising receiving an input relating to at least one of the plurality of style issues, the plurality of spelling issues and the plurality of grammar issues, and adjusting, in the proofing task pane, the total number of identified issues.

12. The method of claim 1, wherein each of the plurality of selectable options is selectively activated based on user input.

13. The method of claim 1, wherein each of the plurality of selectable options is selectively activated based on a writing profile setting template associated with the electronic document.

14. The method of claim 1, wherein each of the plurality of selectable options is selectively activated based on preferences associated with a co-author of the electronic document.

15. The method of claim 14, further comprising receiving a selection of one of the plurality of selectable options and displaying, in place of the proofing task pane, a drill-in pane including contextual information relating at least one co-author preference associated with the selected option.

16. A system for performing operations on a graphical user interface, comprising:

a memory for storying executable program code; and a processor, functionally coupled to the memory, the processor being responsive to computer-executable instructions contained in the program code and operative to:

perform an analysis of an electronic document, wherein the analysis comprises reviewing the electronic document for a plurality of style issues, a plurality of spelling issues and a plurality of grammar issues;

contemporaneously display, in a document processing application, a proofing task pane having a plurality of selectable options, wherein the plurality of selectable options includes a spelling option, a grammar option, an accessibility option, and a writing assistant option, wherein selecting one of the spelling option, the grammar option, the accessibility option, or the writing assistant option allows a user to fix a first issue and a second issue with a spelling issue, a grammar issue, an accessibility issue, or a writing assistance issue, respectively, within the proofing task pane;

based on the analysis of the electronic document, display, in the proofing task pane, a total number of identified issues associated with each of the plurality of style issues, the plurality of spelling issues and the plurality of grammar issues, wherein the first issue and the second issue have a first correction and a second correction, respectively, wherein the first correction and second correction are different, and wherein an application of the first correction to the analysis of the electronic document eliminates the second correction;

calculate a fluency value, based on a fluency metric associated with the electronic document; and display, in the proofing task pane, an indication of the fluency value for the electronic document.

17. The system of claim 16, wherein the processor is further responsive to the computer-executable instructions contained in the program code and operative to:

receive a selection of one of the plurality of selectable options; and display, in place of the proofing task pane, a drill-in pane including additional context related to at least one issue associated with the selected option.

18. A method for performing operations on a graphical user interface, comprising:

performing an analysis of an electronic document, wherein the analysis comprises reviewing the electronic document for a plurality of style issues, a plurality of spelling issues and a plurality of grammar issues;

contemporaneously displaying, in a document processing application, a drill-in pane having a plurality of selectable options, wherein the plurality of selectable options includes a spelling option, a grammar option, an accessibility option and a writing assistant option, wherein at least one of the spelling option, the grammar option, the accessibility option, or the writing assistant option comprises a display of a number of errors associated with that option, wherein selecting one of the spelling option, the grammar option, the accessibility option, or the writing assistant option allows a user to fix an issue with a spelling issue, a grammar issue, an accessibility issue, or a writing assistance issue, respectively, within the drill-in pane, wherein at least one of the spelling option, the grammar option, the accessibility option, or the writing assistant option includes a drill down option to view an error;

based on the analysis of the electronic document, contextually displaying in the drill-in pane, a plurality of identified issues for an issue type;

displaying, in the drill-in pane, a first selectable suggestion and a second selectable suggestion for modifying each of plurality of identified issues for the issue type, wherein an application of the first selectable suggestion to the analysis of the electronic document eliminates the second selectable suggestion, wherein the first selectable suggestion is recommended by a second party; and displaying, in the drill-in pane, an explanation indicating a reason that at least one of the identified issues was identified during analysis of the electronic document for each of the plurality of identified issues for the issue type.

19. The method of claim 18, further comprising displaying, in the drill-in pane, contextual information related to the first or second selectable suggestion.

20. The method of claim 19, wherein the contextual information is selected from one of: one or more definitions for at least one suggested replacement word, and one or more synonyms for at least one suggested replacement word.

* * * * *